US012735566B2

(12) United States Patent
Schwartz et al.

(10) Patent No.: US 12,735,566 B2
(45) Date of Patent: Sep. 15, 2026

(54) PROCESSING OF WEATHERABLE POLY(CARBONATE-CO-MONOARYLATE)S WITH BALANCED FLOW AND IMPACT PROPERTIES

(71) Applicant: SHPP Global Technologies B.V., Bergen op Zoom (NL)

(72) Inventors: Erik Schwartz, Eindhoven (NL); Mark Adrianus Johannes Van Der Mee, Etten Leur (NL)

(73) Assignee: SHPP GLOBAL TECHNOLOGIES B.V., Bergen Op Zoom (NL)

( * ) Notice: Subject to any disclaimer, the term of this patent is extended or adjusted under 35 U.S.C. 154(b) by 608 days.

(21) Appl. No.: 18/265,457

(22) PCT Filed: Dec. 10, 2021

(86) PCT No.: PCT/IB2021/061595
§ 371 (c)(1),
(2) Date: Jun. 6, 2023

(87) PCT Pub. No.: WO2022/123536
PCT Pub. Date: Jun. 16, 2022

(65) Prior Publication Data

US 2024/0034878 A1 Feb. 1, 2024

(30) Foreign Application Priority Data

Dec. 10, 2020 (EP) .................................... 20213151

(51) Int. Cl.

| | |
|---|---|
| ***C08L 69/00*** | (2006.01) |
| ***C08K 5/5393*** | (2006.01) |
| ***C08L 67/02*** | (2006.01) |
| ***C08L 67/03*** | (2006.01) |

(52) U.S. Cl.
CPC ............ *C08L 69/00* (2013.01); *C08K 5/5393* (2013.01); *C08L 67/02* (2013.01); *C08L 67/03* (2013.01); *C08L 69/005* (2013.01); *C08L 2201/02* (2013.01); *C08L 2205/025* (2013.01); *C08L 2205/035* (2013.01)

(58) Field of Classification Search
CPC .......... C08L 69/00; C08L 67/02; C08L 67/03; C08L 69/005; C08L 2201/02; C08L 2205/025; C08L 2205/035; C08K 5/5393
See application file for complete search history.

(56) References Cited

U.S. PATENT DOCUMENTS

| | | | | |
|---|---|---|---|---|
| 4,226,961 | A | 10/1980 | Motz | |
| 7,829,632 | B2 | 11/2010 | Chakravarti et al. | |
| 2015/0197633 | A1* | 7/2015 | van der Mee | C08K 7/14 524/537 |

FOREIGN PATENT DOCUMENTS

| | | | |
|---|---|---|---|
| EP | 3110886 | B1 | 11/2019 |
| WO | 2007081536 | A1 | 7/2007 |
| WO | 2008063722 | A1 | 5/2008 |
| WO | 2008134229 | A1 | 11/2008 |
| WO | 2008134230 | A1 | 11/2008 |
| WO | 2008134340 | A1 | 11/2008 |

OTHER PUBLICATIONS

European Search Report and Search Opinion issued May 11, 2021 in European Application No. 20213151.2 filed Dec. 10, 2020, 6 pages.
International Search Report of the International Searching Authority (ISA/EPO) mailed Mar. 18, 2022 in International Application No. PCT/IB2021/064595 filed Dec. 10, 2021, 5 pages.
Written Opinion of the International Searching Authority (ISA/EPO) mailed Mar. 18, 2022 in International Application No. PCT/IB2021/064595 filed Dec. 10, 2021, 7 pages.
CN OA for the corresponding Chinese Application No. 202180082515.9; Date of Mailing: Aug. 2, 2025; 22 pages.
CN OA for the corresponding Chinese Application No. 202180082515.9; Date of Mailing: Mar. 21, 2025; 11 pages.
EP OA for the corresponding European Application No. 21830336.0; Date of Mailing: Jan. 9, 2026; 6 pages.

* cited by examiner

*Primary Examiner* — Patrick D Niland
(74) *Attorney, Agent, or Firm* — CANTOR COLBURN LLP

(57) ABSTRACT

A polycarbonate composition comprising: 35 to 98 wt % of a poly(carbonate-co-monoarylate ester) comprising aromatic carbonate units, monoaryl carbonate units, or a combination thereof and monoaryl ester units, and optionally aromatic ester units; to less than 50 wt % of a poly(ester) composition comprising greater than 20 to less than 50 wt % of poly(ethylene terephthalate), or 2 to less than 50 wt % of a poly(ester) different from poly(ethylene terephthalate), or a combination of 1-49 wt % of poly(ethylene terephthalate) and 1-49 wt % of a poly(ester) different from poly(ethylene terephthalate); 1 to 50 wt % of a homopolycarbonate, a poly(aliphatic ester-carbonate), or a combination thereof; optionally, 0.001 to 10 wt % of an additive composition; and optionally, 0.5 to 6 wt % of an organophosphorous flame retardant.

20 Claims, 1 Drawing Sheet

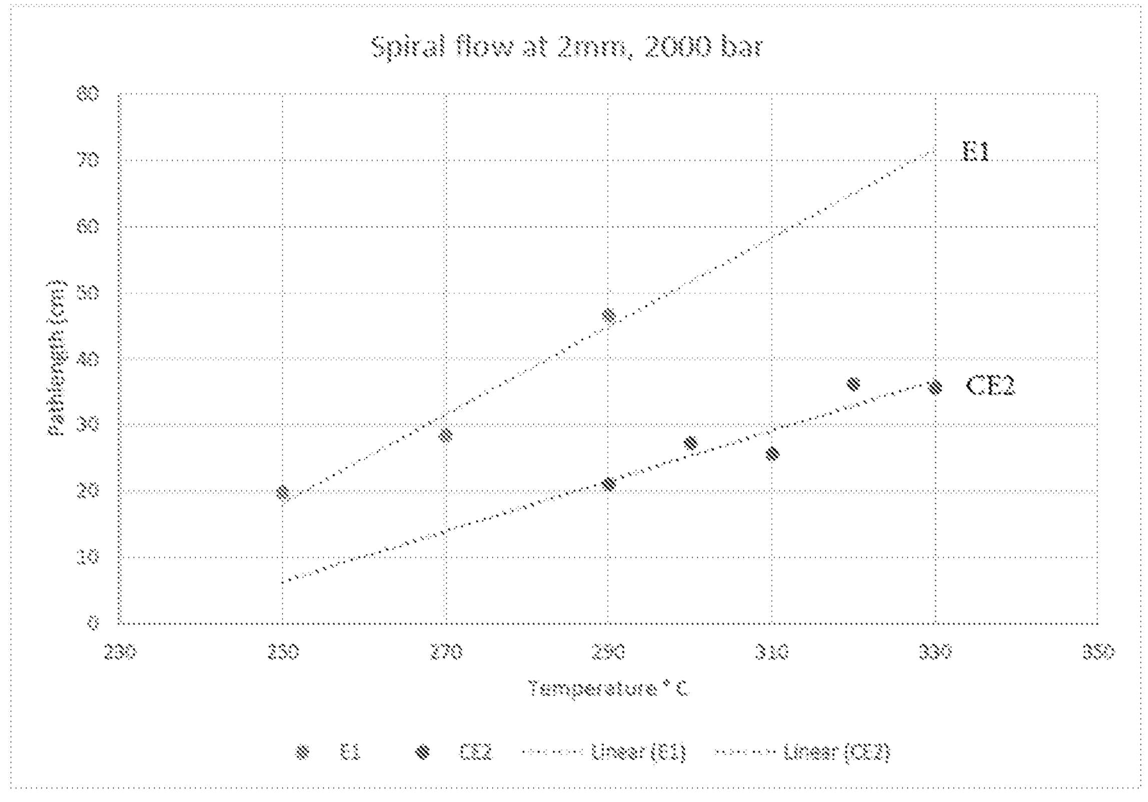
Spiral flow at 2mm, 2000 bar
80
70
60
50
40
30
20
10
0
Pathlength (cm)
230
250
270
290
310
330
350
Temperature ° C
E1
CE2
E1
CE2
Linear (E1)
Linear (CE2)

PROCESSING OF WEATHERABLE POLY(CARBONATE-CO-MONOARYLATE)S WITH BALANCED FLOW AND IMPACT PROPERTIES

CROSS REFERENCE TO RELATED APPLICATIONS

This application is a National Stage application of PCT/IB2021/061595 filed Dec. 10, 2021, which claims priority to and the benefit of European Patent Application No. application Ser. No. 20/213,151.2, filed Dec. 10, 2020, the contents of which are incorporated by reference herein in their entirety.

BACKGROUND

This disclosure relates to polycarbonate compositions, and in particular to weatherable polycarbonate compositions, methods of manufacture, and uses thereof.

Polycarbonates are useful in the manufacture of articles and components for a wide range of applications, from automotive parts to electronic appliances. Because of their broad use, particularly in automotive applications, it is desirable to provide polycarbonates with improved gloss and processability.

There accordingly remains a need in the art for weatherable polycarbonate compositions that improved gloss and processability. It would be a further advantage if the compositions had improved heat and impact resistance.

SUMMARY

The above-described and other deficiencies of the art are met by a polycarbonate composition comprising: 35 to 98 wt % of a poly(carbonate-co-monoarylate ester) comprising aromatic carbonate units, monoaryl carbonate units, or a combination thereof and monoaryl ester units, and optionally aromatic ester units; 2 to less than 50 wt % of a poly(ester) composition comprising greater than 20 to less than 50 wt % of poly(ethylene terephthalate), or 2 to less than 50 wt % of a poly(ester) different from poly(ethylene terephthalate), or a combination of 1-49 wt % of poly (ethylene terephthalate) and 1-49 wt % of a poly(ester) different from poly(ethylene terephthalate); 1 to 50 wt % of a homopolycarbonate, a poly(aliphatic ester-carbonate), or a combination thereof; optionally, 0.001 to 10 wt % of an additive composition; and optionally, 0.5 to 6 wt % of an organophosphorous flame retardant.

In another aspect, a method of manufacture comprises combining the above-described components to form a polycarbonate composition.

In yet another aspect, an article comprises the above-described polycarbonate composition.

In still another aspect, a method of manufacture of an article comprises molding, extruding, or shaping the above-described polycarbonate composition into an article.

The above described and other features are exemplified by the following drawings, detailed description, examples, and claims.

BRIEF DESCRIPTION OF THE DRAWINGS

The following figures are exemplary embodiments wherein the like elements are numbered alike.

FIGURE shows a graph of spiral flow at 2 mm and 2000 bar.

DETAILED DESCRIPTION

In outdoor applications, a balance visual appearance, such as, for example, gloss and color, in addition to heat resistance and high impact strength are desirable. In conventional outdoor applications, such as external parts for automobiles, heavy trucks and agricultural vehicles, painted poly(acrylonitrile butadiene styrene) (ABS) has been used. As design trends have evolved to include more complex part designs with features such as sharper draft angles, larger parts, and thinner parts, conventional compositions are unable to provide the desired combination of properties for the production of components for outdoor applications. For example, some conventional compositions that may provide the desired combination of properties have elevated glass transition temperatures and are therefore not suitable for processes that use machines and tools optimized for resins such as ABS with significantly lower melt and tool temperatures. Therefore, reducing the processing temperatures of polycarbonate compositions while maintaining excellent aesthetics and weathering would provide a cost-effective solution for the manufacture of components for outdoor applications. The inventors hereof discovered a polycarbonate composition that provides the desired balance of gloss and color, heat resistance, and high impact strength coupled with lower processing temperatures. The polycarbonate compositions include: a poly(carbonate-co-monoarylate ester), a poly(ester) composition, and a homopolycarbonate, a poly(aliphatic ester-carbonate), or a combination of a homopolycarbonate and a poly(aliphatic ester-carbonate). The polycarbonate compositions may have a heat deflection temperature of at least 80° C. according to ASTM D648, a gloss at an angle of 60° of at least 95 gloss units as measured according to ISO2813 (2014), or a combination thereof. The polycarbonate compositions may have a glass transition temperature of at least 90° C. as estimated by the Flory-Fox equation, or as experimentally determined by differential scanning calorimetry at a heating rate of 20° C. per minute.

The individual components of the polycarbonate compositions are described in detail below.

The polycarbonate compositions include a poly(carbonate-co-monoarylate ester), a poly(ester) composition, and one or both of a homopolycarbonate, a poly(aliphatic ester-carbonate).

"Polycarbonate" as used herein means a polymer having repeating structural carbonate units of formula (1)

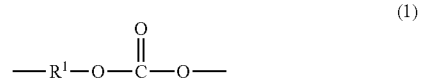

(1)

in which at least 60 percent of the total number of $R^1$ groups contain aromatic moieties and the balance thereof are aliphatic, alicyclic, or aromatic. In an aspect, each $R^1$ is a $C_{6-30}$ aromatic group, that is, contains at least one aromatic moiety. $R^1$ may be derived from an aromatic dihydroxy compound of the formula HO—$R^1$—OH, in particular of formula (2)

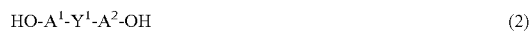

$$HO\text{-}A^1\text{-}Y^1\text{-}A^2\text{-}OH \quad (2)$$

wherein each of $A^1$ and $A^2$ is a monocyclic divalent aromatic group and $Y^1$ is a single bond or a bridging group having one or more atoms that separate $A^1$ from $A^2$. In an aspect, one atom separates $A^1$ from $A^2$. Preferably, each $R^1$ may be derived from a bisphenol of formula (3)

(3)

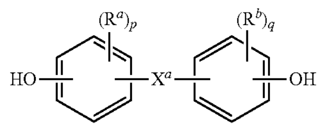

wherein $R^a$ and $R^b$ are each independently a halogen, $C_{1-12}$ alkoxy, or $C_{1-12}$ alkyl, and p and q are each independently integers of 0 to 4. It will be understood that when p or q is less than 4, the valence of each carbon of the ring is filled by hydrogen. Also in formula (3), $X^a$ is a bridging group connecting the two hydroxy-substituted aromatic groups, where the bridging group and the hydroxy substituent of each $C_6$ arylene group are disposed ortho, meta, or para (preferably para) to each other on the $C_6$ arylene group. In an aspect, the bridging group $X^a$ is single bond, —O—, —S—, —S(O)—, —S(O)$_2$—, —C(O)—, or a $C_{1-60}$ organic group. The organic bridging group may be cyclic or acyclic, aromatic or non-aromatic, and may further comprise heteroatoms such as halogens, oxygen, nitrogen, sulfur, silicon, or phosphorous. The $_{1-60}$ organic group may be disposed such that the $C_6$ arylene groups connected thereto are each connected to a common alkylidene carbon or to different carbons of the $C_{1-60}$ organic bridging group. In an aspect, p and q is each 1, and $R^a$ and $R^b$ are each a $C_{1-3}$ alkyl group, preferably methyl, disposed meta to the hydroxy group on each arylene group.

In an aspect, $X^a$ is a $C_{3-18}$ cycloalkylidene, a $C_{1-25}$ alkylidene of formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group. Groups of these types include methylene, cyclohexylmethylidene, ethylidene, neopentylidene, and isopropylidene, as well as 2-[2.2.1]-bicycloheptylidene, cyclohexylidene, 3,3-dimethyl-5-methylcyclohexylidene, cyclopentylidene, cyclododecylidene, and adamantylidene.

In another aspect, $X^a$ is a $C_{1-18}$ alkylene, a $C_{3-18}$ cycloalkylene, a fused $C_{6-18}$ cycloalkylene, or a group of the formula -$J^1$-G-$J^2$- wherein $J^1$ and $J^2$ are the same or different $C_{1-6}$ alkylene and G is a $C_{3-12}$ cycloalkylidene or a $C_{6-16}$ arylene.

For example, $X^a$ may be a substituted $C_{3-18}$ cycloalkylidene of formula (4)

(4)

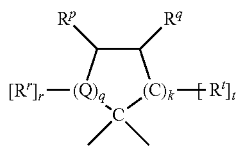

wherein $R^r$, $R^p$, $R^q$, and $R^t$ are each independently hydrogen, halogen, oxygen, or $C_{1-12}$ hydrocarbon groups; Q is a direct bond, a carbon, or a divalent oxygen, sulfur, or —N(Z)— where Z is hydrogen, halogen, hydroxy, $C_{1-12}$ alkyl, $C_{1-12}$ alkoxy, $C_{6-12}$ aryl, or $C_{1-12}$ acyl; r is 0 to 2, t is 1 or 2, q is 0 or 1, and k is 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (4) will have an unsaturated carbon-carbon linkage where the ring is fused. When k is one and q is 0, the ring as shown in formula (4) contains 4 carbon atoms, when k is 2, the ring as shown in formula (4) contains 5 carbon atoms, and when k is 3, the ring contains 6 carbon atoms. In an aspect, two adjacent groups (e.g., $R^q$ and $R^t$ taken together) form an aromatic group, and in another aspect, $R^q$ and $R^t$ taken together form one aromatic group and $R^r$ and $R^p$ taken together form a second aromatic group. When $R^q$ and $R^t$ taken together form an aromatic group, $R^p$ may be a double-bonded oxygen atom, i.e., a ketone, or Q may be —N(Z)— wherein Z is phenyl.

Bisphenols wherein $X^a$ is a cycloalkylidene of formula (4) may be used in the manufacture of polycarbonates containing phthalimidine carbonate units of formula (1a)

(1a)

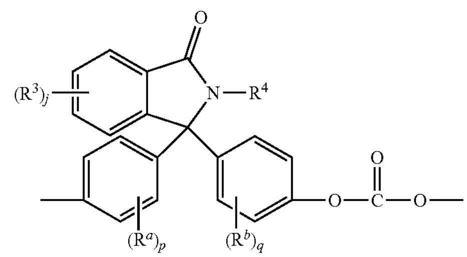

wherein $R^a$, $R^b$, p, and q are as in formula (3), $R^3$ is each independently a $C_{1-6}$ alkyl, j is 0 to 4, and $R_4$ is hydrogen, $C_{1-6}$ alkyl, or a substituted or unsubstituted phenyl, for example a phenyl substituted with up to five $C_{1-6}$ alkyls. For example, the phthalimidine carbonate units are of formula (1b)

(1b)

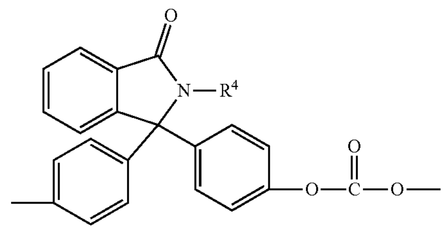

wherein $R^5$ is hydrogen, phenyl optionally substituted with up to five 5 $C_{1-6}$ alkyls, or $C_{1-4}$ alkyl. In an aspect in formula (1b), $R^5$ is hydrogen, methyl, or phenyl, preferably phenyl. Carbonate units (1b) wherein $R^5$ is phenyl may be derived from 2-phenyl-3,3'-bis(4-hydroxy phenyl)phthalimidine (also known as 3,3-bis(4-hydroxyphenyl)-2-phenylisoindolin-1-one, or N-phenyl phenolphthalein bisphenol ("PPPBP")).

Other bisphenol carbonate repeating units of this type are the isatin carbonate units of formula (1c) and (1d)

(1c)

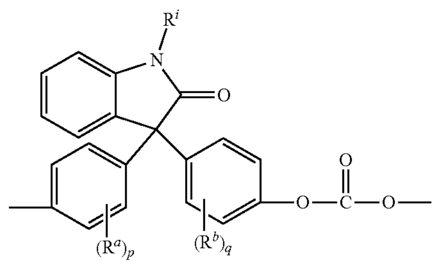

(1d)

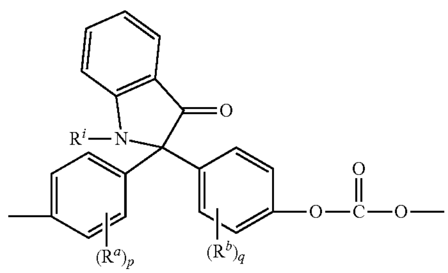

wherein $R^a$ and $R^b$ are each independently a halogen, $C_{1-12}$ alkoxy, or $C_{1-12}$ alkyl, p and q are each independently 0 to 4, and $R^i$ is $C_{1-12}$ alkyl, phenyl optionally substituted with 1 to 5 $C_{1-10}$ alkyl, or benzyl optionally substituted with 1 to 5 $C_{1-10}$ alkyl. In an aspect, $R^a$ and $R^b$ are each methyl, p and q are each independently 0 or 1, and $R^i$ is $C_{1-4}$ alkyl or phenyl.

Other examples of bisphenol carbonate units derived from of bisphenols (3) wherein $X^a$ is a substituted or unsubstituted $C_{3-18}$ cycloalkylidene include the cyclohexylidene-bridged bisphenol of formula (1e)

(1e)

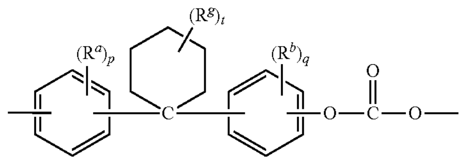

wherein $R^a$ and $R^b$ are each independently $C_{1-12}$ alkyl, $R^g$ is $C_{1-12}$ alkyl, p and q are each independently 0 to 4, and t is 0 to 10. In a specific aspect, at least one of each of $R^a$ and $R^b$ are disposed meta to the cyclohexylidene bridging group. In an aspect, $R^a$ and $R^b$ are each independently $C_{1-4}$ alkyl, $R^g$ is $C_{1-4}$ alkyl, p and q are each 0 or 1, and t is 0 to 5. In another specific aspect, $R^a$, $R^b$, and $R^g$ are each methyl, p and q are each 0 or 1, and t is 0 or 3, preferably 0. In still another aspect, p and q are each 0, each $R^g$ is methyl, and t is 3, such that $X^a$ is 3,3-dimethyl-5-methyl cyclohexylidene.

Examples of other bisphenol carbonate units derived from bisphenol (3) wherein $X^a$ is a substituted or unsubstituted $C_{3-18}$ cycloalkylidene include adamantyl units of formula (1f) and fluorenyl units of formula (1g)

(1f)

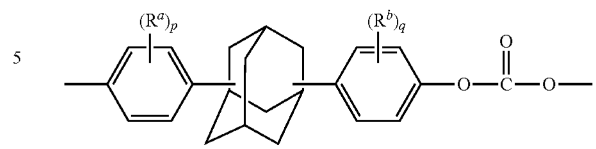

(1g)

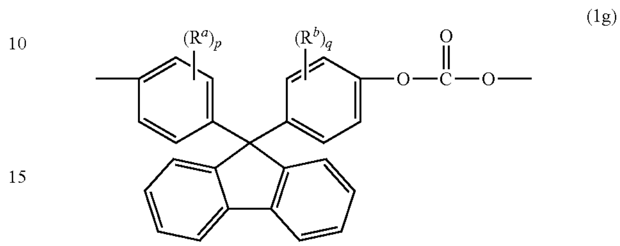

wherein $R^a$ and $R^b$ are each independently $C_{1-12}$ alkyl, and p and q are each independently 1 to 4. In a specific aspect, at least one of each of $R^a$ and $R^b$ are disposed meta to the cycloalkylidene bridging group. In an aspect, $R^a$ and $R^b$ are each independently $C_{1-3}$ alkyl, and p and q are each 0 or 1; preferably, $R^a$, $R^b$ are each methyl, p and q are each 0 or 1, and when p and q are 1, the methyl group is disposed meta to the cycloalkylidene bridging group. Carbonates containing units (1a) to (1g) are useful for making polycarbonates with high glass transition temperatures (Tg) and high heat distortion temperatures.

Other useful dihydroxy compounds of the formula HO—$R^1$—OH include aromatic dihydroxy compounds of formula (6)

(6)

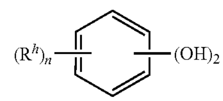

wherein each $R^6$ is independently a halogen atom, $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4. The halogen is usually bromine.

Some illustrative examples of specific dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis (4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis (hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2, 3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like, or a combination thereof.

Specific examples of bisphenol compounds of formula (3) include 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-2-methylphenyl) propane, 1,1-bis(4-hydroxy-t-butylphenyl) propane, 3,3-bis(4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC). A combination may also be used. In a specific aspect, the polycarbonate is a linear homopolymer derived from bisphenol A, in which each of $A^1$ and $A^2$ is p-phenylene and $Y^1$ is isopropylidene in formula (3).

The polycarbonates may have an intrinsic viscosity, as determined in chloroform at 25° C., of 0.3 to 1.5 deciliters per gram (dl/gm), preferably 0.45 to 1.0 dl/gm. The polycarbonates may have a weight average molecular weight (Mw) of 10,000 to 200,000 g/mol, preferably 20,000 to 100,000 g/mol, as measured by gel permeation chromatography (GPC), using a crosslinked styrene-divinylbenzene column and using polystyrene standards and calculated for polycarbonate. As used herein, "using polystyrene standards and calculated for polycarbonate" refers to measurement of the retention time by GPC, fitting the retention time value to a curve for polystyrene and calculating the molecular weight for polycarbonate. GPC samples are prepared at a concentration of 1 mg per ml, and are eluted at a flow rate of 1.5 ml per minute.

The polycarbonate compositions may include a homopolycarbonate. The homopolycarbonate may be derived from post-consumer recycled or post-industrial recycled materials. In an aspect, the homopolycarbonate may be produced from at least one monomer derived from bio-based or plastic waste feedstock.

In some as aspects, the homopolycarbonate includes a bisphenol A homopolycarbonate. The bisphenol A homopolycarbonate may include a bisphenol A homopolycarbonate having a weight average molecular weight of 15,000-20,000 grams per mole, a bisphenol A homopolycarbonate having a weight average molecular weight of 20,000-25,000 grams per mole, or a combination thereof, each as measured via gel permeation chromatography using polystyrene standards and calculated for polycarbonate. In some aspects, the homopolycarbonate may be present for example, from 1-50 wt %, 5-50 wt %, 10-50 wt %, or 15-50 wt %, each based on the total weight of the composition.

"Polycarbonates" includes homopolycarbonates (wherein each $R^1$ in the polymer is the same), copolymers comprising different $R^1$ moieties in the carbonate ("copolycarbonates"), and copolymers comprising carbonate units and other types of polymer units, such as ester units.

A specific type of copolymer is a poly(ester-carbonate), also known as a polyester-polycarbonate. Such copolymers further contain, in addition to recurring carbonate units of formula (1), repeating units of formula (7)

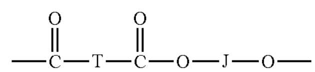

(7)

wherein J is a divalent group derived from a dihydroxy compound (including a reactive derivative thereof), and may be, for example, a $C_{1-10}$ alkylene, a $C_{6-20}$ cycloalkylene, a $C_{5-20}$ arylene, or a polyoxyalkylene in which the alkylene groups contain 2 to 6 carbon atoms, preferably 2, 3, or 4 carbon atoms; and T is a divalent group derived from a dicarboxylic acid (including a reactive derivative thereof), and may be, for example, a $C_{2-20}$ alkylene, a $C_{5-20}$ cycloalkylene, or a $C_{6-20}$ arylene. Copolyesters containing a combination of different T or J groups may be used. The polyester units may be branched or linear.

In an aspect, J is a $C_{2-30}$ alkylene group having a straight chain, branched chain, or cyclic (including polycyclic) structure, for example ethylene, n-propylene, iso-proplyene, 1,4-butylene, 1,4-cyclohexylene, or 1,4-methylenecyclohexane. In another aspect, J is derived from a bisphenol of formula (3), e.g., bisphenol A. In another aspect, J is derived from an aromatic dihydroxy compound of formula (6), e.g, resorcinol.

Aromatic dicarboxylic acids that may be used to prepare the polyester units include isophthalic or terephthalic acid, 1,2-di(p-carboxyphenyl)ethane, 4,4'-dicarboxydiphenyl ether, 4,4'-bisbenzoic acid, or a combination thereof. Acids containing fused rings may also be present, such as in 1,4-, 1,5-, or 2,6-naphthalenedicarboxylic acids. Specific dicarboxylic acids include terephthalic acid, isophthalic acid, naphthalene dicarboxylic acid, 1,4-cyclohexane dicarboxylic acid, or a combination thereof. A specific dicarboxylic acid comprises a combination of isophthalic acid and terephthalic acid wherein the weight ratio of isophthalic acid to terephthalic acid is 91:9 to 2:98.

Specific ester units include ethylene terephthalate, n-propylene terephthalate, n-butylene terephthalate, 1,4-cyclohexanedimethylene terephthalate, and ester units derived from isophthalic acid, terephthalic acid, and resorcinol (ITR)). The molar ratio of ester units to carbonate units in the copolymers may vary broadly, for example 1:99 to 99:1, preferably 10:90 to 90:10, more preferably 25:75 to 75:25, or 2:98 to 15:85, depending on the desired properties of the final composition. Specific poly(ester-carbonate)s are those including bisphenol A carbonate units and isophthalate-terephthalate-bisphenol A ester units, also commonly referred to as poly(carbonate-ester)s (PCE) poly(phthalate-carbonate)s (PPC) depending on the molar ratio of carbonate units and ester units.

In a specific aspect, the polycarbonate copolymer includes a poly(bisphenol A carbonate)-co-(bisphenol A-phthalate-ester) of formula (8a)

(8a)

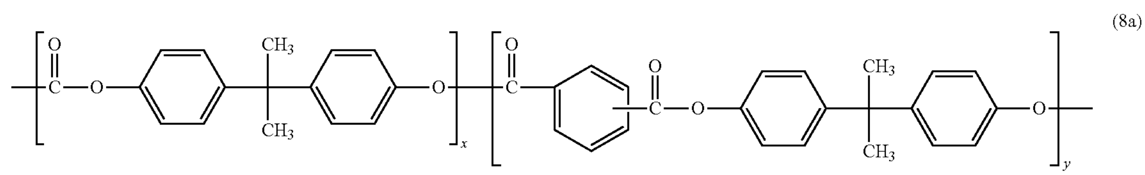

wherein y and x represent the wt % of arylate-bisphenol A ester units and bisphenol A carbonate units, respectively. Generally, the units are present as blocks. In an aspect, the wt % of ester units y to carbonate units x in the copolymers is 50:50 to 99:1, or 55:45 to 90:10, or 75:25 to 95:5. Copolymers of formula (8a) comprising 35 to 45 wt % of carbonate units and 55 to 65 wt % of ester units, wherein the ester units have a molar ratio of isophthalate to terephthalate of 45:55 to 55:45 are often referred to as poly(carbonate-ester)s (PCE). Copolymers comprising 15 to 25 wt % of carbonate units and 75 to 85 wt % of ester units having a molar ratio of isophthalate to terephthalate from 98:2 to 88:12 are often referred to as poly(phthalate-carbonate)s (PPC).

The polycarbonate compositions include a poly(carbonate-co-monoarylate ester) that includes aromatic carbonate units (1) and repeating monoarylate ester units of formula (7b)

(7b)

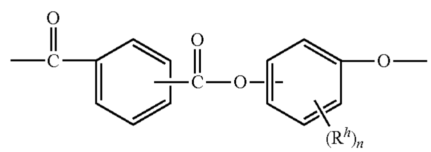

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. Preferably, each $R^h$ is independently a $C_{1-4}$ alkyl, and n is 0 to 3, 0 to 1, or 0. These poly(carbonate-co-monoarylate ester)s include units of formula (8b)

(8b)

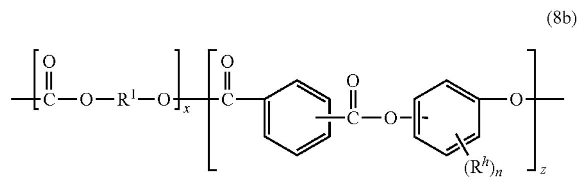

wherein $R^1$ is as defined in formula (1) and $R^h$ and n are as defined in formula (7b), and the mole ratio of carbonate units x to ester units z is from 99:1 to 1:99, or from 98:2 to 2:98, or from 90:10 to 10:90. In an aspect the mole ratio of x:z is from 50:50 to 99:1, or from 1:99 to 50:50.

Preferably, the monoarylate ester unit (7b) is derived from the reaction of a combination of isophthalic and terephthalic diacids (or a reactive derivative thereof) with resorcinol (or a reactive derivative thereof) to provide isophthalate/terephthalate-resorcinol ("ITR" ester units) of formula (7c).

(7c)

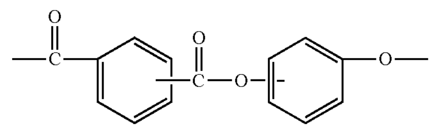

In an aspect, the ITR ester units are present in the polycarbonate copolymer in an amount greater than or equal to 95 mol %, preferably greater than or equal to 99 mol %, and still more preferably greater than or equal to 99.5 mol %, based on the total moles of ester units in the copolymer. In an aspect, the ITR ester units are present in the polycarbonate copolymer and the ratio of isophthalate units to terephthalate units is 1:10 to 10:1, 2:8 to 8:2, 4:6 to 6:4, or 1:1. Such (isophthalate/terephthalate-resorcinol)-carbonate copolymers ("ITR-PC") may possess many desirable features, including toughness, transparency, and weatherability. ITR-PC copolymers may also have desirable thermal flow properties. In addition, ITR-PC copolymers may be readily manufactured on a commercial scale using interfacial polymerization techniques, which allow synthetic flexibility and composition specificity in the synthesis of the ITR-PC copolymers.

A specific example of a poly(carbonate-co-monoarylate ester) is a poly(bisphenol A carbonate-co-isophthalate-terephthalate-resorcinol ester) of formula (8c)

(8c)

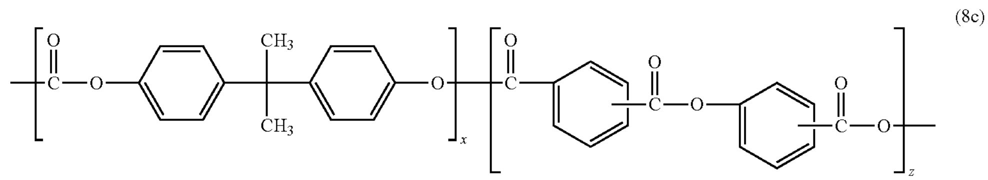

wherein the mole ratio of x:z is or from 98:2 to 2:98, or from 90:10 to 10:90. In an aspect the mole ratio of x:z is from 50:50 to 99:1, or from 1:99 to 50:50. The ITR ester units may be present in the poly(bisphenol A carbonate-co-isophthalate-terephthalate-resorcinol ester) in an amount greater than or equal to 95 mol %, preferably greater than or equal to 99 mol %, and still more preferably greater than or equal to 99.5 mol %, based on the total moles of ester units in the copolymer. Other carbonate units, other ester units, or a combination thereof may be present, in a total amount of 1 to 20 mole %, based on the total moles of units in the copolymers, for example resorcinol carbonate units of formula (20) and bisphenol ester units of formula (7a):

(20)

(7a)

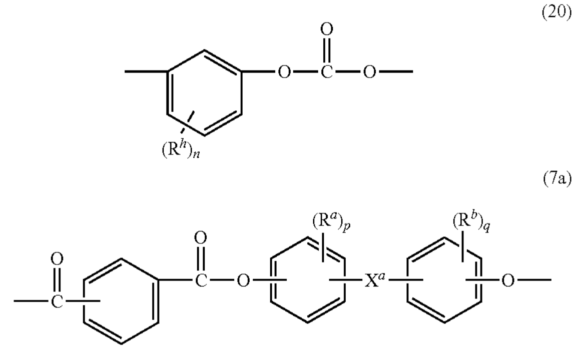

wherein, in the foregoing formulae, $R^b$ is each independently a $C_{1-10}$ hydrocarbon group, n is 0 to 4, $R^a$ and $R^b$ are each independently a $C_{1-12}$ alkyl, p and q are each independently integers of 0 to 4, and $X^a$ is a single bond, —O—, —S—, —S(O)—, —$S(O)_2$—, —C(O)—, or a $C_{1-13}$ alkylidene of formula —$C(R^c)(R^d)$— wherein $R^c$ and $R^d$ are each independently hydrogen or $C_{1-12}$ alkyl, or a group of the formula —$C(=R^e)$— wherein $R^e$ is a divalent $C_{1-12}$ hydrocarbon group. The bisphenol ester units may be bisphenol A phthalate ester units of the formula

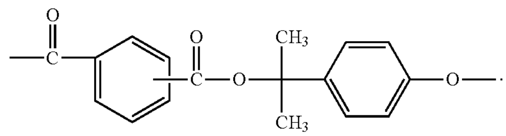

In an aspect, poly(bisphenol A carbonate-co-isophthalate-terephthalate-resorcinol ester) (8c) comprises 1 to 90 mol % of bisphenol A carbonate units, 10-99 mol % of isophthalic acid-terephthalic acid-resorcinol ester units, and optionally 1 to 60 mol % of resorcinol carbonate units, isophthalic acid-terephthalic acid-bisphenol A phthalate ester units, or a combination thereof. In another aspect, poly(bisphenol A carbonate-co-isophthalate-terephthalate-resorcinol ester) (8c) comprises 10 to 20 mol % of bisphenol A carbonate units, 20-98 mol % of isophthalic acid-terephthalic acid-resorcinol ester units, and optionally 1 to 60 mol % of resorcinol carbonate units, isophthalic acid-terephthalic acid-bisphenol A phthalate ester units, or a combination thereof. In some aspects, the poly(carbonate-co-monoarylate ester) comprises 1-90 mol % of bisphenol A carbonate units, 10-99 mol % of isophthalic acid-terephthalic acid-resorcinol ester units, and 1-60 mol % of resorcinol carbonate units, isophthalic acid-terephthalic acid-bisphenol A phthalate ester units, or a combination thereof.

The poly(carbonate-co-monoarylate ester) may be derived from post-consumer recycled or post-industrial recycled materials. In an aspect, the poly(carbonate-co-monoarylate ester) may be produced from at least one monomer derived from bio-based or plastic waste feedstock.

The polycarbonate copolymers comprising arylate ester units are generally prepared from polyester blocks. The polyester blocks may also be prepared by interfacial polymerization. Rather than utilizing the dicarboxylic acid or diol per se, the reactive derivatives of the acid or diol, such as the corresponding acid halides, in particular the acid dichlorides and the acid dibromides may be used. Thus, for example instead of using isophthalic acid, terephthalic acid, or a combination thereof, isophthaloyl dichloride, terephthaloyl dichloride, or a combination thereof may be used. The polyesters may also be obtained by melt-process condensation as described above, by solution phase condensation, or by transesterification polymerization wherein, for example, a dialkyl ester such as dimethyl terephthalate may be transesterified with the dihydroxy reactant using acid catalysis, to generate the polyester blocks. Branched polyester blocks, in which a branching agent, for example, a glycol having three or more hydroxyl groups or a trifunctional or multifunctional carboxylic acid has been incorporated, may be used. Furthermore, it may be desirable to have various concentrations of acid and hydroxyl end groups on the polyester blocks, depending on the ultimate end use of the composition.

The polycarbonate copolymers comprising arylate ester units may have an M. of 2,000-100,000 g/mol, preferably 3,000-75,000 g/mol, more preferably 4,000-50,000 g/mol, more preferably 5,000-35,000 g/mol, and still more preferably 17,000-35,000 g/mol. Molecular weight determinations are performed using GPC using a cross linked styrene-divinyl benzene column, at a sample concentration of 1 milligram per milliliter, using polystyrene standards and calibrated for polycarbonate. Samples are eluted at a flow rate of 1.0 ml/min with methylene chloride as the eluent. In some aspects, the polycarbonate copolymers comprising monoarylate ester units have an M. of 25,000-35,000 g/mol, preferably 27,000-35,000 g/mol.

The poly(carbonate-co-monoarylate ester)s may be present, for example, from 35-98 wt %, 35-80 wt %, 35-70 wt %, 35-60 wt %, 35-55 wt %, or 50-80 wt %, each based on the total weight of the composition.

In addition to the poly(carbonate-co-monoarylate ester), the polycarbonate compositions include a homopolycarbonate, a poly(ester-carbonate), or a combination thereof. The poly(ester-carbonate) may include a specific example of a poly(ester-carbonate) (i.e., a poly(aliphatic ester-carbonate). A poly(aliphatic ester-carbonate) may be derived from a linear $C_{6-20}$ aliphatic dicarboxylic acid (which includes a reactive derivative thereof), specifically a linear $C_{6-12}$ aliphatic dicarboxylic acid (which includes a reactive derivative thereof). Specific dicarboxylic acids include n-hexanedioic acid (adipic acid), n-demayedioic acid (sebacic acid), and alpha, omega-$C_{12}$ dicarboxylic acids such as dodemayedioic acid (DDDA). A specific poly(aliphatic ester)-polycarbonate is of formula (8):

(8)

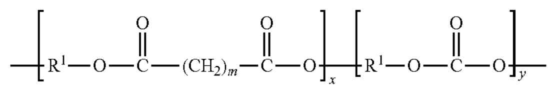

wherein each $R^1$ may be the same or different, and is as described in formula (1), m is 4 to 18, preferably 4 to 10, and the average molar ratio of ester units to carbonate units x:y is 99:1 to 1:99, including 13:87 to 2:98, or 9:91 to 2:98, or 8:92 to 2:98. In a specific aspect, the poly(aliphatic ester)-polycarbonate copolymer comprises bisphenol A sebacate ester units and bisphenol A carbonate units, having, for example an average molar ratio of x:y of 2:98 to 8:92, for example 6:94. Such poly(aliphatic ester-carbonate)s are commercially available as LEXAN HFD from SABIC (LEXAN is a trademark of SABIC).

The poly(aliphatic ester-carbonate) may have a weight average molecular weight of 15,000 to 40,000 g/mol, including 20,000 to 38,000 g/mol (measured by GPC based on BPA polycarbonate standards). In some aspects, the poly (aliphatic ester-carbonate) includes a poly(aliphatic ester-carbonate) having a weight average molecular weight from 18,000-30,000 g/mol, preferably 20,000-25,000 g/mol; a poly(aliphatic ester-carbonate) having a weight average molecular weight from 30,000-40,000 g/mol, preferably 35,000-40,000 g/mol; or a combination thereof, each as measured via gel permeation chromatography using polystyrene standards and calculated for polycarbonate.

The poly(aliphatic ester-carbonate) may be present, for example, from 1-50 wt %, 5-50 wt %, 5-30 wt %, 10-50 wt %, 10-30 wt %, 10-25 wt %, or 15-50 wt %, each based on the total weight of the composition.

Polycarbonates can be manufactured by processes such as interfacial polymerization and melt polymerization, which are known, and are described, for example, in WO 2013/175448 A1 and WO 2014/072923 A1. An end-capping agent (also referred to as a chain stopper agent or chain terminating agent) can be included during polymerization to provide end groups, for example monocyclic phenols such as phenol, p-cyanophenol, and $C_{1-22}$ alkyl-substituted phenols such as p-cumyl-phenol, resorcinol monobenzoate, and p- and tertiary-butyl phenol, monoethers of diphenols, such as p-methoxyphenol, monoesters of diphenols such as resorcinol monobenzoate, functionalized chlorides of aliphatic monocarboxylic acids such as acryloyl chloride and methacryoyl chloride, and mono-chloroformates such as phenyl chloroformate, alkyl-substituted phenyl chloroformates, p-cumyl phenyl chloroformate, and toluene chloroformate. Combinations of different end groups can be used. Branched polycarbonate blocks can be prepared by adding a branching agent during polymerization, for example trimellitic acid, trimellitic anhydride, trimellitic trichloride, tris-p-hydroxyphenylethane, isatin-bis-phenol, tris-phenol TC (1,3,5-tris ((p-hydroxyphenyl)isopropyl)benzene), tris-phenol PA (4(4 (1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of 0.05 to 2.0 wt. %. Combinations comprising linear polycarbonates and branched polycarbonates can be used.

The polycarbonate compositions include poly(ester) composition. The poly(ester) composition may include a single poly(ester) or a combination of two or more poly(ester)s. Useful poly(ester)s include, for example, polyesters having repeating units of formula (7), which include poly(alkylene dicarboxylates), liquid crystalline poly(ester)s, and poly (ester) copolymers. The polyesters described herein are generally completely miscible with the polycarbonates when blended.

The poly(ester)s may be obtained by interfacial polymerization or melt-process condensation as described above, by solution phase condensation, or by transesterification polymerization wherein, for example, a dialkyl ester such as dimethyl terephthalate may be transesterified with ethylene glycol using acid catalysis, to generate poly(ethylene terephthalate). A branched polyester, in which a branching agent, for example, a glycol having three or more hydroxyl groups or a trifunctional or multifunctional carboxylic acid has been incorporated, may be used. Furthermore, it may be desirable to have various concentrations of acid and hydroxyl end groups on the polyester, depending on the ultimate end use of the composition.

Useful polyesters may include aromatic polyesters, poly (alkylene esters) including poly(alkylene arylates), and poly (cycloalkylene diesters). Aromatic polyesters may have a polyester structure according to formula (7), wherein J and T are each aromatic groups as described above. In an aspect, useful aromatic polyesters may include poly(isophthalate-terephthalate-resorcinol) esters, poly(isophthalate-terephthalate-bisphenol A) esters, poly[(isophthalate-terephthalate-resorcinol) ester-co-(isophthalate-terephthalate-bisphenol A)] ester, or a combination comprising at least one of these. Also contemplated are aromatic polyesters with a minor amount, e.g., 0.5 to 10 wt %, based on the total weight of the polyester, of units derived from an aliphatic diacid or an aliphatic polyol to make copolyesters. Poly(alkylene arylates) may have a polyester structure according to formula (7), wherein T comprises groups derived from aromatic dicarboxylates, cycloaliphatic dicarboxylic acids, or derivatives thereof. Examples of preferably useful T groups include 1,2-, 1,3-, and 1,4-phenylene; 1,4- and 1,5-naphthylenes; cis- or trans-1,4-cyclohexylene; and the like. Preferably, where T is 1,4-phenylene, the poly(alkylene arylate) is a poly(alkylene terephthalate). In addition, for poly(alkylene arylate), preferably useful alkylene groups J include, for example, ethylene, 1,4-butylene, and bis-(alkylene-disubstituted cyclohexane) including cis- or trans-1,4-(cyclohexylene)dimethylene. Examples of poly(alkylene terephthalates) include poly(ethylene terephthalate) (PET), poly (1,4-butylene terephthalate) (PBT), and poly(n-propylene terephthalate) (PPT). Also useful are poly(alkylene naphthoates), such as poly(ethylene naphthanoate) (PEN), and poly(butylene naphthanoate) (PBN). A preferably useful poly(cycloalkylene diester) is poly(1,4-cyclohexanedimethylene terephthalate) (PCT). Combinations comprising at least one of the foregoing polyesters may also be used.

Copolymers comprising alkylene terephthalate repeating ester units with other ester groups may also be useful. Preferably useful ester units may include different alkylene terephthalate units, which may be present in the polymer chain as individual units, or as blocks of poly(alkylene terephthalates). Copolymers of this type include poly(cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate).

Poly(cycloalkylene diester)s may also include poly(alkylene cyclohexanedicarboxylate)s. Of these, a specific example is poly(1,4-cyclohexane-dimethanol-1,4-cyclohexanedicarboxylate) (PCCD), having recurring units of formula (9)

(9)

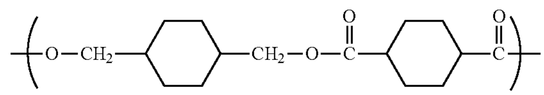

wherein, as described using formula (7), J is a 1,4-cyclohexanedimethylene group derived from 1,4-cyclohexanedimethanol, and T is a cyclohexane ring derived from cyclohexanedicarboxylate or a chemical equivalent thereof, and may comprise the cis-isomer, the trans-isomer, or a combination thereof.

The polycarbonate and polyester may be used in a weight ratio of 1:99 to 99:1, preferably 10:90 to 90:10, and more preferably 30:70 to 70:30, depending on the function and properties desired.

It is desirable for such a polyester and polycarbonate blend to have an MVR of 5 to 150 $cm^3$/10 min., preferably 7 to 125 $cm^3$/10 min, more preferably 9 to 110 $cm^3$/10 min, and still more preferably 10 to 100 $cm^3$/10 min., measured at 300° C. and a load of 1.2 kilograms according to ASTM D1238-04.

In some aspects, the poly(ester) composition includes poly(ethylene terephthalate), a poly(ester) different from poly(ethylene terephthalate), or a combination thereof and may be present, for example, from 1 to less than 50 wt %, 1-40 wt %, or 1-30 wt %, each based on the total weight of the composition.

In some aspects, the poly(ester) composition includes poly(ethylene terephthalate) and excludes a poly(ester) different from poly(ethylene terephthalate). When poly(ethylene terephthalate) is the only poly(ester) in the poly(ester) composition, the poly(ester) composition (i.e., poly(ethylene terephthalate)) may be present, for example, from greater than 20 to less than 50 wt %, from 25 to less than 50 wt %, from greater than 20 to less than 50 wt %, from 25 to less than 50 wt %, from greater than 20 to 40 wt %, or from 25 to 40 wt %, each based on the total weight of the composition.

The poly(ester) composition may include a poly(ester) different from poly(ethylene terephthalate), either alone or in combination with poly(ethylene terephthalate). The poly (ester) different from poly(ethylene terephthalate) may include poly(1,4-butylene terephthalate), poly(n-propylene terephthalate), poly(ethylene naphthanoate), and poly(butylene naphthanoate), poly(cyclohexanedimethylene terephthalate)-co-poly(ethylene terephthalate), poly(1,4-cyclohexane-dimethanol-1,4-cyclohexanedicarboxylate), or a combination thereof, preferably poly(1,4-butylene terephthalate), poly(1,4-cyclohexane-dimethanol-1,4-cyclohexanedicarboxylate), poly(cyclohexanedimethylene terephthalate)-co-poly(ethylene terephthalate), or a combination thereof. In some aspects, poly(ethylene terephthalate) is absent.

The poly(ester) composition may be derived from post-consumer recycled or post-industrial recycled materials. In an aspect, the poly(ester) composition may be produced from at least one monomer derived from bio-based or plastic waste feedstock.

In some aspects, the poly(ester) composition includes a poly(ester) different from poly(ethylene terephthalate) and excludes poly(ethylene terephthalate). In such aspects, the poly(ester) composition (i.e., poly(ester) different from poly (ethylene terephthalate) may be present, for example, from 2 to less than 50 wt %, 2-40 wt %, 2-30 wt %, 5 to less than 50 wt %, 5-40 wt %, 5-30 wt %, or 10-30 wt %, each based on the total weight of the composition.

In some aspects, the poly(ester) composition includes a poly(ester) different from poly(ethylene terephthalate) in combination with poly(ethylene terephthalate). In such aspects, each of the poly(ethylene terephthalate) and the poly(ester) different from poly(ethylene terephthalate) may be present, for example, from 1-49 wt %, 1-39 wt %, or 1-29 wt %, each based on the total weight of the composition.

The polycarbonate composition may include an organophosphorous flame retardant containing at least one aromatic group. In such aspects, the aromatic group may be a substituted or unsubstituted $C_{3-30}$ group containing one or more of a monocyclic or polycyclic aromatic moiety (which may optionally contain with up to three heteroatoms (N, O, P, S, or Si)) and optionally further containing one or more non-aromatic moieties, for example alkyl, alkenyl, alkynyl, or cycloalkyl. The aromatic moiety of the aromatic group may be directly bonded to the phosphorous-containing group, or bonded via another moiety, for example an alkylene group. The aromatic moiety of the aromatic group may be directly bonded to the phosphorous-containing group, or bonded via another moiety, for example an alkylene group. In an aspect the aromatic group is the same as an aromatic group of the polycarbonate backbone, such as a bisphenol group (e.g., bisphenol A), a monoarylene group (e.g., a 1,3-phenylene or a 1,4-phenylene), or a combination comprising at least one of the foregoing.

The organophosphorous flame retardant may be a phosphate ($P({=}O)(OR)_3$), phosphite ($P(OR)_3$), phosphonate ($RP({=}O)(OR)_2$), phosphinate ($R_2P({=}O)(OR)$), phosphine oxide ($R_3P({=}O)$), or phosphine ($R_3P$), wherein each R in the foregoing phosphorous-containing groups may be the same or different, provided that at least one R is an aromatic group. A combination of different phosphorous-containing groups may be used. The aromatic group may be directly or indirectly bonded to the phosphorous, or to an oxygen of the phosphorous-containing group (i.e., an ester).

In an aspect the organophosphorous flame retardant is a monomeric phosphate. Representative monomeric aromatic phosphates are of the formula $(GO)_3P{=}O$, wherein each G is independently an alkyl, cycloalkyl, aryl, alkylarylene, or arylalkylene group having up to 30 carbon atoms, provided that at least one G is an aromatic group. Two of the G groups may be joined together to provide a cyclic group. In some aspects G corresponds to a monomer used to form the polycarbonate, e.g., resorcinol. Exemplary phosphates include phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, and the like. A specific aromatic phosphate is one in which each G is aromatic, for example, triphenyl phosphate, tricresyl phosphate, isopropylated triphenyl phosphate, and the like.

Di- or polyfunctional aromatic organophosphorous compounds are also useful, for example, compounds of the formulas

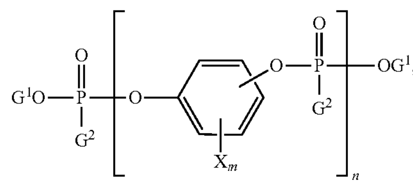

-continued

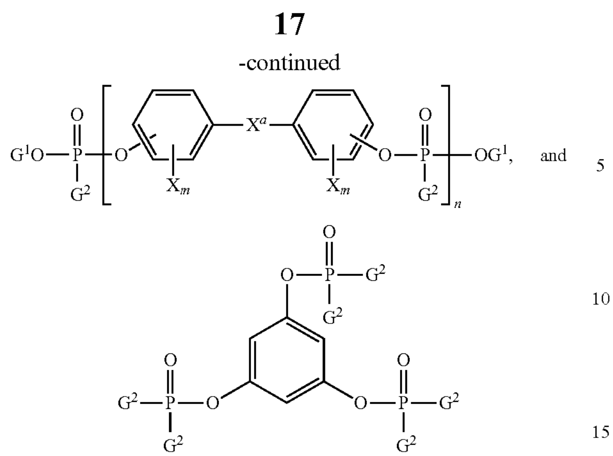

and wherein each $G^1$ is independently a $C_{1-30}$ hydrocarbyl; each $G^2$ is independently a $C_{1-30}$ hydrocarbyl or hydrocarbyloxy; $X^a$ is as defined in formula (3) or formula (4); each X is independently a bromine or chlorine; m is 0 to 4, and n is 1 to 30. In a specific aspect, $X^a$ is a single bond, methylene, isopropylidene, or 3,3,5-trimethylcyclohexylidene.

Specific aromatic organophosphorous compounds are inclusive of acid esters of formula (9)

(9)

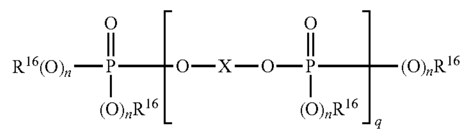

wherein each $R^{16}$ is independently $C_{1-8}$ alkyl, $C_{5-6}$ cycloalkyl, $C_{6-20}$ aryl, or $C_{7-12}$ arylalkylene, each optionally substituted by $C_{1-12}$ alkyl, specifically by $C_{1-4}$ alkyl and X is a mono- or poly-nuclear aromatic $C_{6-30}$ moiety or a linear or branched $C_{2-30}$ aliphatic radical, which may be OH-substituted and may contain up to 8 ether bonds, provided that at least one $R^{16}$ or X is an aromatic group; each n is independently 0 or 1; and q is from 0.5 to 30. In some aspects each $R^{16}$ is independently $C_{1-4}$ alkyl, naphthyl, phenyl($C_{1-4}$)alkylene, aryl groups optionally substituted by $C_{1-4}$ alkyl; each X is a mono- or poly-nuclear aromatic $C_{6-30}$ moiety, each n is 1; and q is from 0.5 to 30. In some aspects each $R^{16}$ is aromatic, e.g., phenyl; each X is a mono- or poly-nuclear aromatic $C_{6-30}$ moiety, including a moiety derived from formula (2); n is one; and q is from 0.8 to 15. In other aspects, each $R^{16}$ is phenyl; X is cresyl, xylenyl, propylphenyl, or butylphenyl, one of the following divalent groups

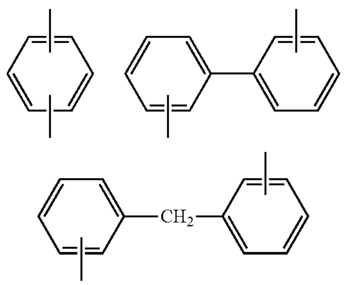

-continued

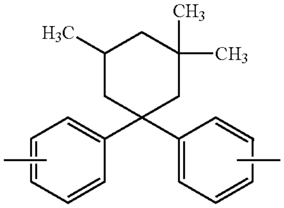

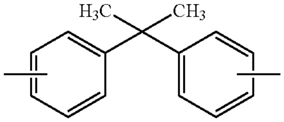

, or a combination comprising one or more of the foregoing; n is 1; and q is from 1 to 5, or from 1 to 2. In some aspects at least one $R^{16}$ or X corresponds to a monomer used to form the polycarbonate, e.g., bisphenol A, resorcinol, or the like. Aromatic organophosphorous compounds of this type include the bis(diphenyl) phosphate of hydroquinone, resorcinol bis(diphenyl phosphate) (RDP), and bisphenol A bis (diphenyl) phosphate (BPADP), and their oligomeric and polymeric counterparts.

The organophosphorous flame retardant may include an organophosphorous compound containing a phosphorous-nitrogen bond may be a phosphazene, phosphonitrilic chloride, phosphorous ester amide, phosphoric acid amide, phosphonic acid amide, phosphinic acid amide, or tris(aziridinyl) phosphine oxide. These flame-retardant additives are commercially available. In an aspect, the organophosphorous flame retardant containing a phosphorous-nitrogen bond is a phosphazene or cyclic phosphazene of the formulas

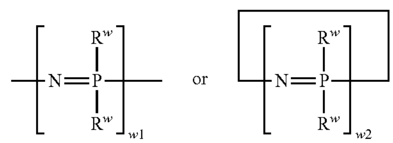

wherein w1 is 3 to 10,000; w2 is 3 to 25, or 3 to 7; and each $R^w$ is independently a $C_{1-12}$ alkyl, alkenyl, alkoxy, aryl, aryloxy, or polyoxyalkylene group. In the foregoing groups at least one hydrogen atom of these groups may be substituted with a group having an N, S, O, or F atom, or an amino group. For example, each $R^w$ may be a substituted or unsubstituted phenoxy, an amino, or a polyoxyalkylene group. Any given $R^w$ may further be a crosslink to another phosphazene group. Exemplary crosslinks include bisphenol groups, for example bisphenol A groups. Examples include phenoxy cyclotriphosphazene, octaphenoxy cyclotetraphosphazene decaphenoxy cyclopentaphosphazene, and the like. In an aspect, the phosphazene has a structure represented by the formula

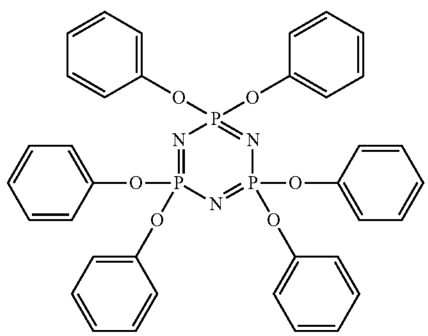 [SMILES: c1ccc(OP2(Oc3ccccc3)=NP(Oc3ccccc3)(Oc3ccccc3)=NP(Oc3ccccc3)(Oc3ccccc3)=N2)cc1]

Commercially available phenoxyphosphazenes having the aforementioned structures are LY202 manufactured and distributed by Lanyin Chemical Co., Ltd, FP-110 manufactured and distributed by Fushimi Pharmaceutical Co., Ltd, and SPB-100 manufactured and distributed by Otsuka Chemical Co., Ltd.

When present, the organophosphorous flame retardant may be included in the composition in an amount of 0.5 to 6 wt %, based on the total weight of the polycarbonate composition. Within this range, the flame retardant may be present in an amount of 1 to 5 wt %, or 1.5 to 4 wt %, or 1.5 to 3.5 wt %. In an aspect, the flame retardant may comprise the oligomeric phosphate ester and may be present in the composition in an amount of 0.5 to 6 wt %, or 1 to 6 wt %, or 2 to 6 wt % or 2.5 to 6 wt %. In an aspect, the flame retardant may comprise the phosphazene and may be present in an amount of 0.5 to 5 wt %, or 0.5 to 4 wt %, or 1 to 3 wt %, or 1.5 to 2.5 wt %. In an aspect, the flame retardant may comprise the phosphate ester flame retardant and may be present in an amount of 0.5 to 5 wt %, or 1 to 5 wt %, or 2 to 4 wt % or 2.5 to 3.5 wt %.

In some aspects, the polycarbonate composition includes 35-60 wt % of a poly(carbonate-co-monoarylate ester) comprising bisphenol A carbonate units, resorcinol carbonate units, and ester units derived from isophthalic acid, terephthalic acid, or a combination thereof and resorcinol; 5-30 wt % of poly(1,4-butylene terephthalate); and 25-50 wt % of a poly(aliphatic ester)-polycarbonate copolymer comprising bisphenol A sebacate ester units and bisphenol A carbonate units, or 25-50 wt % of a bisphenol A homopolycarbonate.

In some aspects, the polycarbonate composition includes 35-60 wt % of a poly(carbonate-co-monoarylate ester) comprising bisphenol A carbonate units, resorcinol carbonate units, and ester units derived from isophthalic acid, terephthalic acid, or a combination thereof and resorcinol; 5-30 wt % of poly(1,4-butylene terephthalate); 10-25 wt % of poly (aliphatic ester)-polycarbonate copolymer comprising bisphenol A sebacate ester units and bisphenol A carbonate units; and 10-25 wt % of a bisphenol A homopolycarbonate.

In some aspects, the polycarbonate composition includes 35-60 wt % of a poly(carbonate-co-monoarylate ester) comprising bisphenol A carbonate units, resorcinol carbonate units, and ester units derived from isophthalic acid, terephthalic acid, or a combination thereof and resorcinol; greater than 20 to less than 50 wt % of poly(ethylene terephthalate), and 1-50 wt % of a bisphenol A homopolycarbonate.

In some aspects, the polycarbonate composition includes 35-60 wt % of a poly(carbonate-co-monoarylate ester) comprising bisphenol A carbonate units, resorcinol carbonate units, and ester units derived from isophthalic acid, terephthalic acid, or a combination thereof and resorcinol; 20 to less than 50 wt % of poly(butylene terephthalate), and 1-50 wt % of a bisphenol A homopolycarbonate.

In some aspects, the polycarbonate composition includes 50-80 wt % of a poly(carbonate-co-monoarylate ester) comprising bisphenol A carbonate units, resorcinol carbonate units, and ester units derived from isophthalic acid, terephthalic acid, or a combination thereof and resorcinol; 10-30 wt % of poly(butylene terephthalate), and 1-50 wt % of a bisphenol A homopolycarbonate.

In some aspects, the polycarbonate composition includes 35-60 wt % of a poly(carbonate-co-monoarylate ester) comprising bisphenol A carbonate units, resorcinol carbonate units, and ester units derived from isophthalic acid, terephthalic acid, or a combination thereof and resorcinol; 10-30 wt % of poly(1,4-cyclohexane-dimethanol-1,4-cyclohexanedicarboxylate), poly(cyclohexanedimethylene terephthalate)-co-poly(ethylene terephthalate), or a combination thereof; and 1-50 wt % of a bisphenol A homopolycarbonate.

The polycarbonate composition may include various additives ordinarily incorporated into polymer compositions of this type, with the proviso that the additive(s) are selected so as to not significantly adversely affect the desired properties of the polycarbonate composition, in particular gloss, heat deflection temperature, and melt viscosity rate. Such additives may be mixed at a suitable time during the mixing of the components for forming the composition. Additives include impact modifiers, fillers, reinforcing agents, antioxidants, heat stabilizers, light stabilizers, ultraviolet (UV) light stabilizers, plasticizers, lubricants, mold release agents, antistatic agents, colorants such as such as titanium dioxide, carbon black, and organic dyes, surface effect additives, radiation stabilizers, flame retardants, and anti-drip agents. A combination of additives may be used, for example a combination of a colorant, a heat stabilizer, mold release agent, and ultraviolet light stabilizer. In general, the additives are used in the amounts generally known to be effective. For example, the total amount of the additives (other than any impact modifier, filler, or reinforcing agents) may be 0.001 to 10 wt %, or 0.001 to 5 wt %, based on the total weight of the polycarbonate composition.

The additive composition may include an antimicrobial agent. Any antimicrobial agent generally known may be used either individually or in combination (i.e., of two or more). Exemplary antimicrobial agents may include, but are not limited to a metal containing agent, such as Ag, Cu, Al, Sb, As, Ba, Bi, B, Au, Pb, Hg, Ni, Th, Sn, Zn containing agent. In an aspect, the agent may be Ag containing agent. A suitable Ag containing agent may contain a silver ion, colloidal silver, silver salt, silver complex, silver protein, silver nanoparticle, silver functionalized clay, zeolite containing silver ions or any combinations thereof. Silver salts or silver complexes may include silver acetate, silver benzoate, silver carbonate, silver ionate, silver iodide, silver lactate, silver laureate, silver nitrate, silver oxide, silver palpitate, silver sulfadiazine, silver sulfate, silver chloride, or any combinations thereof.

When present, the antimicrobial agent may be included in an amount of 0.001 to 10 wt %, based on the total weight of the polycarbonate composition. In an aspect, the composition may contain Ag-containing agent(s) in amounts such that and the silver content in the composition of 0.01 to 5 wt %.

The thermoplastic compositions can be manufactured by various methods. For example, powdered polycarbonate and poly(ester)s, or other optional components are first blended, optionally with fillers in a HENSCHEL-Mixer® high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding directly into the extruder at the throat or downstream through a side stuffer. Additives can also be compounded into a masterbatch with a desired polymeric polymer and fed into the extruder. The extruder is generally operated at a temperature higher than that necessary to cause the composition to flow. The extrudate is immediately quenched in a water bath and pelletized. The pellets so prepared can be one-fourth inch long or less as desired. Such pellets can be used for subsequent molding, shaping, or forming.

Molded samples of the polycarbonate compositions may have a gloss at a 60° angle of at least 95, 95-120, or 95-110 gloss units as measured according to ISO2813 (2014).

The polycarbonate compositions may have a heat deflection temperature (HDT) of at least 80° C. and a maximum value of 115° C. to allow use under relatively mild molding conditions, measured at 1.8 megapascal (MPa) (flat) according to ASTM D648.

The polycarbonate compositions may have a melt volume rate (MVR) of at least 22 $cm^3$ per 10 min, 22-100 $cm^3$ per 10 min, 22-60 $cm^3$ per 10 min, 22-50 $cm^3$ per 10 min, preferably 25 $cm^3$ per 10 min, 25-100 $cm^3$ per 10 min, 25-60 $cm^3$ per 10 min, or 25-50 $cm^3$ per 10 min, each as determined at 300° C. using a 1.2-kilogram weight, over 10 minutes, in accordance with ISO1133.

Shaped, formed, or molded articles comprising the polycarbonate compositions are also provided. Articles include those used in outdoor applications or those exposed to the outdoor environments. The article includes an automotive component comprising an exterior or interior automotive component such as a fender, a hood, a fascia, a front glass, a grill, a wiper, a steering wheel, a steering column, a seating system, an instrument panel, a roof, a trim, a door panel, a pillar floor rocker, a cross-bar, a glazing panel, knee bolster, a headlamp assembly, a rear lamp assembly, a fog lamp, or an indicator light. Some example of articles include computer and business machine housings such as housings for monitors, handheld electronic device housings such as housings for cell phones, electrical connectors, electrical switches, consumer electronics, connected devices for wireless (e.g., 5G), medical devices, components of lighting fixtures, ornaments, home appliances, roofs, greenhouses, sunrooms, swimming pool enclosures, and the like.

The polycarbonate compositions may be molded into useful shaped articles by a variety of methods, such as injection molding, extrusion, rotational molding, blow molding and thermoforming.

This disclosure is further illustrated by the following examples, which are non-limiting.

EXAMPLES

The following components are used in the examples. Unless specifically indicated otherwise, the amount of each component is in wt %, based on the total weight of the composition.

The materials shown in Table 1 were used.

TABLE 1

| Component | Description | Source |
|---|---|---|
| PC-1 | Linear bisphenol A polycarbonate homopolymer, prepared by interfacial process, Mw = 21,000-23,000 g/mol as per GPC using polystyrene standards and calculated for polycarbonate, p-cumylphenol (PCP) endcapped | SABIC |
| PC-2 | Linear bisphenol A polycarbonate homopolymer, prepared by interfacial process, Mw = 18,000-20,000 g/mol as per GPC using polystyrene standards and calculated for polycarbonate, p-cumylphenol (PCP) endcapped | SABIC |
| PBT1 | Polybutylene terephthalate, CAS Reg. No. 26062-94-2, with an intrinsic viscosity of 0.6-0.7 dl/g | SABIC |
| HFD1 | Sebacic acid-bisphenol A copolymer, 5.7 mol % sebacic acid, p-cumylphenol endcap, MFR = 45 g/10 min based on ASTM D1238, Mw = 20,000 to 22,000 as determined via GPC using polystyrene standards and calculated for polycarbonate | SABIC |
| HFD2 | Sebacic acid-bisphenol A copolymer, 8.3 mol % sebacic acid, p-cumylphenol endcap, MFR = 6.5 g/10 min based on ASTM D1238, Mw = 35,000-37,000, as determined via GPC using polystyrene standards and calculated for polycarbonate | SABIC |
| ITR-PC | Poly(bisphenol A carbonate-resorcinol phthalate) having 73-77 mol % bisphenol A carbonate linkages, 5-7 mol % resorcinol carbonate linkages, and 18-20 mol % resorcinol phthalate linkages with an isophthalate:terephthalate ratio of 1:1; Tg = 140-145° C., Mw = 29,000-31,000 g/mol as per GPC using polystyrene standards and calculated for polycarbonate | SABIC |
| PCTG1 | Poly(1,4-cyclohexylene dimethylene co-ethylene terephthalate) | EASTMAN CHEMICAL |
| PCCD | 1,4-cyclohexylidene cyclohexane-1,4-dicarboxylate | EASTMAN CHEMICAL |
| PHOSPHITE | Tris(2,4-di-tert-butylphenyl) phosphite, available as IRGAFOS 168 | BASF |
| ADD1 | Cycloaliphatic, diepoxy functional organic compound, commercially available under trade name ERL 4221E | DOW |
| ADD2 | Phosphonite PEPQ | Clariant |
| UV1 | BENZOTRIAZOLE 5411 | BASF |
| PET | Polyethylene terephthalate, intrinsic viscosity 0.66 dl/g | |
| PETS | Pentaerythritol tetrastearate, >90% esterified | Faci |

Typical compounding procedures are described as follows: Formulations were compounded on a 25 mm Werner Pfleiderer ZSK co-rotating twin-screw extruder with a vacuum vented standard LEXAN mixing screw operated at a screw speed of 300 rpm. The temperature profile is given in Table 2. The strand was cooled through a water bath prior to pelletizing. An Engel 45, 75, 90 molding machine was used to mold the test parts for standard physical property testing. The pellets were dried for 3-4 hours at 90-110° C. in a forced air-circulating oven prior to injection molding. A typical extrusion profile is listed in Table 2.

TABLE 2

| Parameter | Unit | Value |
|---|---|---|
| Die | mm | 2 holes |
| Feed Temp | ° C. | 40 |
| Zone 1 Temp | ° C. | 180-200 |
| Zone 2-8 Temp | ° C. | 250-270 |
| Die Temp | ° C. | 250-270 |
| Screw speed | rpm | 300 |
| Throughput | kg/hr | 40 |
| Vacuum 1 | bar | 0.7 |

The extruded pellets were molded into testing specimens after drying the extruded pellets at 120° C. for 3 hours using injection molding (for parameters see Table 3).

TABLE 3

| Parameters | Unit | Engel molding machine |
|---|---|---|
| Pre-drying time | Hour | 3-4 |
| Pre-drying temp | ° C. | 90-110 |
| Hopper temp | ° C. | 40 |
| Zone 1 temp | ° C. | 250-280 |
| Zone 2 temp | ° C. | 265-295 |
| Zone 3 temp | ° C. | 270-300 |
| Nozzle temp | ° C. | 265-295 |
| Mold temp | ° C. | 75-90 |
| Screw speed | rpm | 25 |
| Back pressure | bar | 7 |
| Injection time | s | 1.9 |
| Approximate cycle time | s | 45 |

Spiral flow testing were performed according to the following conditions using a spiral insert of 2 mm, 2000 bar pressure and a various temperature profile of 250° C. The results of the spiral flow testing are shown in FIGURE.

Physical measurements were made using the tests and test methods described below. Injection molded test specimens were molded in accordance with ISO test methods. The specimens were conditioned for 48 hours prior to testing.

TABLE 4

| Test method | Test equipment | Conditions |
|---|---|---|
| ISO 306 | VICAT softening point | 50N, 120° C./h |
| ASTM D648 | HDT | 1.8 MPa |
| ASTM D 638 | Tensile Properties | Test speed of 50 mm/min at room temperature on standard ASTM tensile bar |
| ASTM D 790 | Flexural Properties | 3.2 mm thick sample plaque, a 100 mm span at a test speed of 2 mm/min |
| ISO 527 | Zwick Z010 tensile flex robot | 23° C., 50 mm/min |
| ISO 180 | ISO IZOD impact | 80 × 10 × 3.0 mm sample, notched, 23° C. and −30° C. |
| ASTM D256 | ASTM IZOD impact | 3.2 mm thick sample plaque, notched, Various Temp |
| ISO 11443 | Melt viscosity (MV) | Various shear rates from 100 to 10,000/s at 280, 300, 320° C. |
| ISO 1133 | Melt Volume Rate (MVR) | 300° C., 300 sec dwell time, 1.2 kg |
| ISO 2813 | Gloss | 3.2 mm color plaques measured at 20° C., 60° C., and 85° |
| ASTM D3763 | Multi-axial impact (MAI) | 3.2 mm plaques, at 3.3 m/s and a temperature of 23° C. and/or −30° C. |

Examples 1-8

Table 6 shows the compositions and properties for Comparative Examples 1-3 and Examples 4-8.

| Components | Units | 1* | 2* | 3* | 4 | 5 | 6 | 7 | 8 |
|---|---|---|---|---|---|---|---|---|---|
| ITR-PC | wt % | 45.00 | 45.00 | 45.00 | 45.00 | 45.00 | 45.00 | 45.00 | 45.00 |
| HFD-1 | wt % | | | | | | 29.15 | 39.15 | 17.07 |
| HFD-2 | wt % | | | | | | 5.00 | 5.00 | |
| PET | wt % | | | 20.00 | | | | | |
| PBT | wt % | | | | 20.00 | 10.00 | 20.00 | 10.00 | 20.00 |
| PC-1 | wt % | 54.15 | | | | | | | 17.08 |
| PC-2 | wt % | | 54.15 | 34.15 | 34.15 | 44.15 | | | |
| PETS | wt % | 0.3 | 0.3 | 0.3 | 0.3 | 0.3 | 0.3 | 0.3 | 0.3 |
| ADD1 | wt % | 0.03 | 0.03 | 0.03 | 0.03 | 0.03 | 0.03 | 0.03 | 0.03 |
| UV1 | wt % | 0.2 | 0.2 | 0.2 | 0.2 | 0.2 | 0.2 | 0.2 | 0.2 |
| ADD2 | wt % | 0.06 | 0.06 | 0.06 | 0.06 | 0.06 | 0.06 | 0.06 | 0.06 |
| COLOR-1 | wt % | 0.13 | 0.13 | 0.13 | 0.13 | 0.13 | 0.13 | 0.13 | 0.13 |
| COLOR-2 | wt % | 0.13 | 0.13 | 0.13 | 0.13 | 0.13 | 0.13 | 0.13 | 0.13 |
| Total | wt % | 100 | 100 | 100 | 100 | 100 | 100 | 100 | 100 |
| Properties | | | | | | | | | |
| Flexural Stress, yield, 2 mm/min | MPa | 96 | 95 | 93 | 99 | 99 | 98 | 97 | 100 |

-continued

| Components | Units | 1* | 2* | 3* | 4 | 5 | 6 | 7 | 8 |
|---|---|---|---|---|---|---|---|---|---|
| Flexural Modulus, 2 mm/min | MPa | 2450 | 2378 | 2370 | 2427 | 2382 | 2386 | 2379 | 2484 |
| Notched Izod Impact | kJ/m$^2$ | 77 | 58 | 8 | 7 | 8 | 9 | 11 | 9 |
| MAI (puncture energy), 3.3 m/s | J | 80 | 115 | 85 | 90 | 91 | | | |
| HDT, 1.8 MPa, flat | ° C. | 124 | 121 | 109 | 93 | 105 | 92 | 102 | 92 |
| Density | g/cm$^3$ | 1.21 | 1.21 | 1.24 | 1.23 | 1.22 | 1.22 | 1.21 | 1.22 |
| MVR (300° C., 12 kg) | cm$^3$/10 min | 16 | 27 | 19 | 31 | 29 | 35 | 30 | 42 |
| MV at 280° C., 1000 1/s shear rate | | 460 | 359 | 357 | 230 | 273 | 218 | 261 | 200 |
| Gloss at 20° | | | 101 | 58 | 99 | 100 | 101 | 103 | 102 |
| Gloss at 60° | | | 103 | 92 | 103 | 103 | 101 | 102 | 102 |
| Gloss at 85° | | | 101 | 99 | 99 | 100 | | | |

*Comparative Examples

Comparative Example 1 shows that a combination of poly(ester-carbonate) ("ITR-PC") and BPA-homopolycarbonate ("PC-1") resulted in an HDT greater than 115° C. and an MVR less than 25 cm$^3$ per 10 min. Comparison of Comparative Example 1 with 2 shows that replacement of the higher molecular weight BPA-homopolycarbonate ("PC-1") with a lower molecular weight BPA-homopolycarbonate ("PC-2") resulted in an improvement in MVR (from 16 to 27 cm$^3$ per 10 min) but the HDT was not improved. Comparative Example 3 shows that the combination of ITR-PC, BPA-homopolycarbonate ("PC-2"), and poly(ethylene terephthalate) resulted in a decrease in HDT, but MVR and gloss value at 60° were not within the desired ranges. Examples 4-5 included a combination of ITR-PC, poly(butylene terephthalate) ("PBT"), and BPA-homopolycarbonate resulted in a desirable combination of MVR, HDT and gloss value at 600°. Examples 6-7 show that a combination of ITR-PC, HFD-1 and/or HFD-2, and PBT provide an HDT less than 115, an MVR greater than 25, and a gloss value at 60° greater than 95 gloss units. Example 8 shows that the replacement of some of the poly(ester)s (i.e., HFD-1, HFD-2, and/or PBT) with PC-2 did not adversely affect the HDT or the gloss value at 600° and resulted in an improved MVR.

Example 9-18

Table 6 shows the compositions and for Examples 9-18.

| Components | Unit | 9 | 10 | 11 | 12* | 13* | 14 | 15* | 16 | 17 | 18 |
|---|---|---|---|---|---|---|---|---|---|---|---|
| ITR-PC | wt % | 45.0 | 45.0 | 45.0 | 45.0 | 45.0 | 45.0 | 45.0 | 55.0 | 65.0 | 75.0 |
| PET | wt % | | | | 30.0 | 40.0 | | | | | |
| PBT | wt % | 30.0 | 40.0 | 50.0 | | | | | 20.0 | 20.0 | 20.0 |
| PCCD | wt % | | | | | | 20.0 | | | | |
| PCTG 1 | wt % | | | | | | | 20.0 | | | |
| PC-2 | wt % | 24.15 | 14.15 | 4.15 | 24.15 | 14.15 | 34.15 | 34.15 | 24.15 | 14.15 | 4.15 |
| PETS | wt % | 0.3 | 0.3 | 0.3 | 0.3 | 0.3 | 0.3 | 0.3 | 0.3 | 0.3 | 0.3 |
| ADD1 | wt % | 0.03 | 0.03 | 0.03 | 0.03 | 0.03 | 0.03 | 0.03 | 0.03 | 0.03 | 0.03 |
| UV1 | wt % | 0.2 | 0.2 | 0.2 | 0.2 | 0.2 | 0.2 | 0.2 | 0.2 | 0.2 | 0.2 |
| ADD2 | wt % | 0.06 | 0.06 | 0.06 | 0.06 | 0.06 | 0.06 | 0.06 | 0.06 | 0.06 | 0.06 |
| COLOR-1 | wt % | 0.13 | 0.13 | 0.13 | 0.13 | 0.13 | 0.13 | 0.13 | 0.13 | 0.13 | 0.13 |
| COLOR-2 | wt % | 0.13 | 0.13 | 0.13 | 0.13 | 0.13 | 0.13 | 0.13 | 0.13 | 0.13 | 0.13 |
| Total | wt % | 100 | 100 | 100 | 100 | 100 | 100 | 100 | 100 | 100 | 100 |
| Properties | | | | | | | | | | | |
| Flexural Stress, yield, 2 mm/min | MPa | 95 | 87 | 82 | 91 | 91 | 85 | 90 | 97 | 97 | 96 |
| Flexural Modulus, 2 mm/min | MPa | 2279 | 2181 | 2118 | 2281 | 2304 | 2009 | 2088 | 2261 | 2290 | 2302 |
| Notched Izod Impact | kJ/m$^2$ | 11 | 8 | 9 | 11 | 11 | 84 | 73 | 8 | 9 | 9 |
| MAI (puncture energy), 3.3 m/s | J | 82 | 130 | — | 97 | 117 | 93 | 117 | 123 | 122 | 126 |
| HDT, 1.8 MPa, flat | ° C. | 81 | 71 | 63 | 102 | 100 | 104 | 109 | 92 | 91 | 92 |

-continued

| Components | Unit | 9 | 10 | 11 | 12* | 13* | 14 | 15* | 16 | 17 | 18 |
|---|---|---|---|---|---|---|---|---|---|---|---|
| Density | g/cm$^3$ | 1.23 | 1.24 | 1.25 | 1.25 | 1.26 | 1.2 | 1.21 | 1.23 | 1.23 | 1.23 |
| MVR (300° C., 1 2 kg) | cm$^3$/10 min | 48 | 57 | 69 | 19 | 17 | 24 | 18 | 37 | 31 | 26 |
| Gloss at 20° | | 106 | 101 | 90 | 105 | 104 | 101 | 106 | 103 | 100 | 83 |
| Gloss at 60° | | 103 | 102 | 98 | 103 | 102 | 101 | 103 | 102 | 103 | 100 |
| Gloss at 85° | | 100 | 100 | 96 | 100 | 98 | 100 | 100 | 99 | 100 | 97 |

*Comparative Examples.

Examples 9-10 show that in compositions having a combination of poly(ester-carbonate) ("ITR-PC") and BPA-homopolycarbonate ("PC-2") that having an amount of PBT ranging from 20 to 40 wt % can provide PBT provide an HDT of at least 80° C., an MVR greater than 25, and a gloss value at 60° greater than 95 gloss units. Comparative Example 11 shows that an amount of PBT of 50 wt % resulted in an HDT of less than 80° C. Comparative Examples 12-13 show that replacement of PBT with PET results in a decrease in the MVR values below the threshold value of 22, preferably 25 cm$^3$/10 min (e.g., 19 and 17 cm$^3$/10 min, respectively). Example 14 shows that using poly(1,4-cyclohexane-dimethanol-1,4-cyclohexane dicarboxylate) (PCCD) as the polyester instead of PBT results in a decrease in MVR to 24 cm$^3$/10 min but also results in a robust impact resistance. Comparative Example 15 shows that replacement of PBT with poly(cyclohexanedimethylene terephthalate)-co-poly(ethylene terephthalate), where the polymer comprises greater than or equal to 50 mol % of poly(ethylene terephthalate) (PCTG-1) results in an even greater decrease in MVR below the preferred threshold value of 25 cm$^3$/10 min (e.g., 18 cm$^3$/10 min). Comparison of Examples 16-18 show that for compositions having PBT as the polyester that decreasing the amount of homopolycarbonate (PC-2) by replacing it with ITR-PC results in a modest decrease in the MVR, but well above the preferred threshold value of 25 cm$^3$/10 min.

This disclosure further encompasses the following aspects.

Aspect 1: A polycarbonate composition comprising: 35 to 98 wt % of a poly(carbonate-co-monoarylate ester) comprising aromatic carbonate units, monoaryl carbonate units, or a combination thereof and monoaryl ester units, and optionally aromatic ester units; 2 to less than 50 wt % of a poly(ester) composition comprising greater than 20 to less than 50 wt % of poly(ethylene terephthalate), or 2 to less than 50 wt % of a poly(ester) different from poly(ethylene terephthalate), or a combination of 1-49 wt % of poly (ethylene terephthalate) and 1-49 wt % of a poly(ester) different from poly(ethylene terephthalate); 1 to 50 wt % of a homopolycarbonate, a poly(aliphatic ester-carbonate), or a combination thereof; optionally, 0.001 to 10 wt % of an additive composition; and optionally, 0.5 to 6 wt % of an organophosphorous flame retardant.

Aspect 1a: The polycarbonate composition of Aspect 1, wherein the poly(ester) composition comprises 20 to less than 50 wt % of poly(ethylene terephthalate).

Aspect 1b: The polycarbonate composition of Aspect 1, wherein the poly(ester) composition comprises 2 to less than 50 wt % of a poly(ester) different from poly(ethylene terephthalate)

Aspect 1c: The polycarbonate composition of Aspect 1, wherein the poly(ester) composition comprises a combination of 1-49 wt % of poly(ethylene terephthalate) and 1-49 wt % of a poly(ester) different from poly(ethylene terephthalate).

Aspect 2: The polycarbonate composition of Aspect 1, 1a, 1b, or 1c wherein the composition has a heat deflection temperature of at least 80° C. according to ASTM D648, wherein a molded sample of the composition has a gloss value at an angle of 60° of at least 95 gloss units measured according to ISO2813 (2014), or a combination thereof.

Aspect 2a: The polycarbonate composition of Aspect 2, wherein the composition has a heat deflection temperature of at least 80° C. to 115° C. according to ASTM D648.

Aspect 2b: The polycarbonate composition of Aspect 2 or 2a, wherein the melt volume rate is at least 22, preferably 25 cm$^3$ per 10 min, each as determined at 300° C. using a 1.2-kilogram weight, over 10 minutes, in accordance with ISO1133.

Aspect 3: The polycarbonate composition of Aspect 1 or Aspect 2, 2a or 2b wherein the poly(carbonate-co-monoarylate ester) comprises units of formula

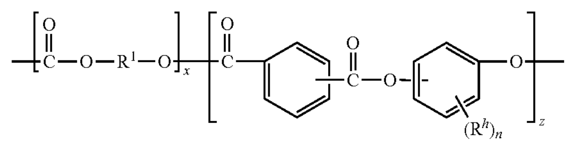

wherein: $R^1$ is a $C_{6-30}$ aromatic group having at least one aromatic moiety, $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4, preferably, $R^h$ is a $C_{1-4}$ alkyl, and n is 0 to 3, 0 to 1, or 0, and a mole ratio of carbonate units x to ester units z is from 99:1 to 1:99, or from 98:2 to 2:98, or from 90:10 to 10:90.

Aspect 4: The polycarbonate composition of any of the preceding aspects, wherein the monoaryl carbonate units have the structure

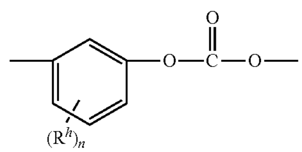

and the aromatic ester units have the structure

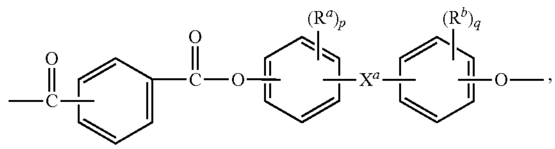

wherein $R^h$ is each independently a $C_{1-10}$ hydrocarbon group, n is 0-4, $R^a$ and $R^b$ are each independently a $C_{1-12}$ alkyl, p and q are each independently integers of 0-4, and $X^a$ is a single bond, —O—, —S—, —S(O)—, —$S(O)_2$—, —C(O)—, or a $C_{1-13}$ alkylidene of formula —$C(R^c)(R^d)$— wherein $R^c$ and $R^d$ are each independently hydrogen or $C_{1-12}$ alkyl, or a group of the formula —$C(=R^e)$— wherein $R^e$ is a divalent $C_{1-12}$ hydrocarbon group.

Aspect 5: The polycarbonate composition of any one of the preceding aspects, wherein the poly(carbonate-co-monoarylate ester) comprises 1-90 mol % of bisphenol A carbonate units, 10-99 mol % of isophthalic acid-terephthalic acid-resorcinol ester units, and 1-60 mol % of resorcinol carbonate units, isophthalic acid-terephthalic acid-bisphenol A phthalate ester units, or a combination thereof.

Aspect 6: The polycarbonate composition of any one of the preceding aspects, wherein the poly(carbonate-co-monoarylate ester) comprises 60-90 mol % of bisphenol A carbonate units, 10-30 mol % of isophthalic acid-terephthalic acid-resorcinol ester units, and 1-20 mol % of resorcinol carbonate units, isophthalic acid-terephthalic acid-bisphenol A phthalate ester units, or a combination thereof, preferably 60-90 mol % of bisphenol A carbonate units, 10-30 mol % of isophthalic acid-terephthalic acid-resorcinol ester units, and 1-20 mol % of resorcinol carbonate units.

Aspect 7: The polycarbonate composition of any one of the preceding aspects, wherein the poly(aliphatic ester-carbonate) has the structure

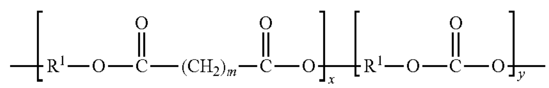

m is 4 to 18, preferably 4 to 10, an average molar ratio of ester units to carbonate units x:y is 99:1 to 1:99, and $R^1$ is a linear $C_6$-20 aliphatic group.

Aspect 8: The polycarbonate composition of any one of the preceding aspects, wherein the poly(ester) different from poly(ethylene terephthalate) comprises a poly(alkylene terephthalate) different from poly(ethylene terephthalate), a poly (alkylene naphthoate), poly(alkylene cyclohexanedicarboxylate), a copolymer thereof, or a combination thereof.

Aspect 9: The polycarbonate composition of any one of the preceding aspects, wherein the poly(ester) different from poly(ethylene terephthalate) comprises: poly(1,4-butylene terephthalate), poly(n-propylene terephthalate), poly(ethylene naphthanoate), and poly(butylene naphthanoate), poly (cyclohexanedimethylene terephthalate)-co-poly(ethylene terephthalate), poly(1,4-cyclohexane-dimethanol-1,4-cyclohexanedicarboxylate), or a combination thereof, preferably poly(1,4-butylene terephthalate), poly(1,4-cyclohexane-dimethanol-1,4-cyclohexanedicarboxylate), poly(cyclohexanedimethylene terephthalate)-co-poly(ethylene terephthalate), or a combination thereof.

Aspect 10: The polycarbonate composition of any one of the preceding aspects, wherein the homopolycarbonate comprises a bisphenol A homopolycarbonate having a weight average molecular weight of 15,000-20,000 grams per mole, a bisphenol A homopolycarbonate having a weight average molecular weight of 20,000-25,000 grams per mole, or a combination thereof, each as measured via gel permeation chromatography using polystyrene standards and calculated for polycarbonate.

Aspect 11: The polycarbonate composition of any one of the preceding aspects, wherein the poly(aliphatic ester-carbonate) comprises a poly(aliphatic ester-carbonate) having a weight average molecular weight from 18,000-30,000 grams/mole, preferably 20,000-25,000 grams/mole; or a poly(aliphatic ester-carbonate) having a weight average molecular weight from 30,000-45,000 grams/mole, preferably 35,000-40,000 grams/mole; or a combination thereof, each as measured via gel permeation chromatography using polystyrene standards and calculated for polycarbonate.

Aspect 12: The polycarbonate composition of any one of the preceding aspects comprising 35-60 wt % of a poly (carbonate-co-monoarylate ester) comprising bisphenol A carbonate units, ester units derived from isoterephthalic acid, terephthalic acid, or a combination thereof and resorcinol, and resorcinol carbonate units; 5-30 wt % of poly(1, 4-butylene terephthalate); and 25-50 wt % of a poly(aliphatic ester)-polycarbonate copolymer comprising bisphenol A sebacate ester units and bisphenol A carbonate units; or 25-50 wt % of a bisphenol A homopolycarbonate.

Aspect 13: The polycarbonate composition of any one of the preceding aspects comprising: 35-60 wt % of a poly (carbonate-co-monoarylate ester) comprising bisphenol A carbonate units and ester units derived from isoterephthalic acid, terephthalic acid, or a combination thereof and resorcinol, and resorcinol carbonate units; 5-30 wt % of poly(1, 4-butylene terephthalate); 10-25 wt % of poly(aliphatic ester)-polycarbonate copolymer comprising bisphenol A sebacate ester units and bisphenol A carbonate units; and 10-25 wt % of a bisphenol A homopolycarbonate.

Aspect 14: An article comprising the polycarbonate composition of any one of the preceding aspects, preferably wherein the article is: an interior or exterior automotive component, more preferably, a fender, a hood, a fascia, a front glass, a grill, a wiper, a steering wheel, a steering column, a seating system, an instrument panel, a roof, trim, a door panel, a pillar a floor rocker, a cross-bar, a glazing panel, a knee bolster, a headlamp assembly, a rear lamp assembly, a fog lamp, or an indicator light, computer and business machine housings, preferably housings for monitors, handheld electronic device housings such as housings for cell phones, electrical connectors, electrical switches, consumer electronics, a connected device for wireless, or a medical device.

Aspect 15: A method for forming the article according to aspect 14, comprising molding, casting, or extruding the composition to provide the article.

The compositions, methods, and articles may alternatively comprise, consist of, or consist essentially of, any appropriate materials, steps, or components herein disclosed. The compositions, methods, and articles may additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other (e.g., ranges of "up to 25 wt %, or, more specifically, 5 wt % to 20 wt %", is inclusive of the endpoints and all intermediate values of the ranges of "5 wt % to 25 wt %," etc.). "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments. A "combination thereof" is open and includes any combination comprising at least one of the listed components or properties optionally together with a like or equivalent component or property not listed Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

The term "alkyl" means a branched or straight chain, unsaturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl ($—HC{=}CH_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene ($—CH_2—$) or, propylene ($—(CH_2)_3—$)). "Cycloalkylene" means a divalent cyclic alkylene group, $—C_nH_{2n-x}$, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. "Arylene" means a divalent aryl group. "Alkylarylene" means an arylene group substituted with an alkyl group. "Arylalkylene" means an alkylene group substituted with an aryl group (e.g., benzyl). The prefix "halo" means a group or compound including one more of a fluoro, chloro, bromo, or iodo substituent. A combination of different halo groups (e.g., bromo and fluoro), or only chloro groups may be present. The prefix "hetero" means that the compound or group includes at least one ring member that is a heteroatom (e.g., 1, 2, or 3 heteroatom(s)), wherein the heteroatom(s) is each independently N, O, S, Si, or P. "Substituted" means that the compound or group is substituted with at least one (e.g., 1, 2, 3, or 4) substituents that may each independently be a $C_{1-9}$ alkoxy, a $C_{1-9}$ haloalkoxy, a nitro ($—NO_2$), a cyano (—CN), a $C_{1-6}$ alkyl sulfonyl ($—S({=}O)_2$-alkyl), a $C_{6-12}$ aryl sulfonyl ($—S({=}O)_2$-aryl) a thiol (—SH), a thiocyano (—SCN), a tosyl ($CH_3C_6H_4SO_2—$), a $C_{3-12}$ cycloalkyl, a $C_{2-12}$ alkenyl, a $C_{5-12}$ cycloalkenyl, a $C_{6-12}$ aryl, a $C_{7-13}$ arylalkylene, a $C_{4-12}$ heterocycloalkyl, and a $C_{3-12}$ heteroaryl instead of hydrogen, provided that the substituted atom's normal valence is not exceeded. The number of carbon atoms indicated in a group is exclusive of any substituents. For example $—CH_2CH_2CN$ is a $C_2$ alkyl group substituted with a nitrile.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A polycarbonate composition consisting essentially of, based on the total weight of the composition 35 to 98 wt % of a poly (carbonate-co-monoarylate ester) comprising aromatic carbonate units, monoaryl carbonate units, or a combination thereof and monoaryl ester units, and optionally aromatic ester units;

2 to less than 50 wt % of a poly (ester) composition comprising, based on the total weight of the composition greater than 20 to less than 50 wt % of poly (ethylene terephthalate), or 2 to less than 50 wt % of a poly (ester) different from poly (ethylene terephthalate), or a combination of 1-49 wt % of poly (ethylene terephthalate) and 1-49 wt % of a poly (ester) different from poly (ethylene terephthalate);

1 to 50 wt % of a homopolycarbonate, a poly (aliphatic ester-carbonate), or a combination thereof;

optionally, 0.001 to 10 wt % of an additive composition, optionally, 0.5 to 6 wt % of an organophosphorous flame retardant.

2. The polycarbonate composition of claim 1, wherein the composition has a heat deflection temperature of at least 80° C. according to ASTM D648, wherein a molded sample of the composition has a gloss value at an angle of 60° of at least 95 gloss units measured according to ISO2813 (2014), or a combination thereof.

3. The polycarbonate composition of claim 1, wherein the poly (carbonate-co-monoarylate ester) comprises units of formula

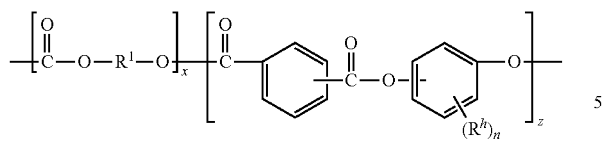

wherein:

$R^1$ is a $C_{6-30}$ aromatic group having at least one aromatic moiety, $R^h$ is independently a halogen atom, a $C_{1-10}$ hydrocarbyl, a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4, and a mole ratio of carbonate units x to ester units z is from 99:1 to 1:99.

4. The polycarbonate composition of claim 1, wherein the monoaryl carbonate units have the structure

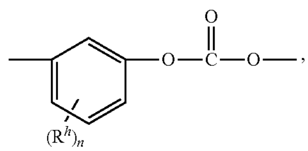

and the aromatic ester units have the structure

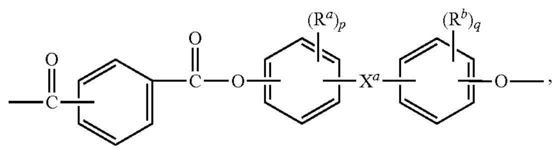

wherein $R^h$ is each independently a $C_{1-10}$ hydrocarbon group, n is 0-4, $R^a$ and $R^b$ are each independently a $C_{1-12}$ alkyl, p and q are each independently integers of 0-4, and $X^a$ is a single bond, —O—, —S—, —S(O)—, —$S(O)_2$—, —C(O)—, or a $C_{1-13}$ alkylidene of formula —$C(R^c)(R^d)$-wherein $R^c$ and $R^d$ are each independently hydrogen or $C_{1-12}$ alkyl, or a group of the formula —$C(=R^e)$— wherein $R^e$ is a divalent $C_{1-12}$ hydrocarbon group.

5. The polycarbonate composition of claim 1, wherein the poly(carbonate-co-monoarylate ester) comprises 1-90 mol % of bisphenol A carbonate units, 10-99 mol % of isophthalic acid-terephthalic acid-resorcinol ester units, and 1-60 mol % of resorcinol carbonate units, isophthalic acid-terephthalic acid-bisphenol A phthalate ester units, or a combination thereof.

6. The polycarbonate composition of claim 1, wherein the poly(carbonate-co-monoarylate ester) comprises 60-90 mol % of bisphenol A carbonate units, 10-30 mol % of isophthalic acid-terephthalic acid-resorcinol ester units, and 1-20 mol % of resorcinol carbonate units, isophthalic acid-terephthalic acid-bisphenol A phthalate ester units, or a combination thereof.

7. The polycarbonate composition of claim 1, wherein the poly (aliphatic ester-carbonate) has the structure

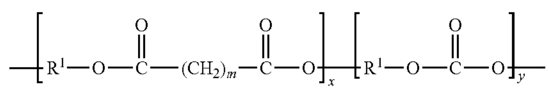

m is 4 to 18, an average molar ratio of ester units to carbonate units x:y is 99:1 to 1:99, and $R^1$ is a linear $C_{6-20}$ aliphatic group.

8. The polycarbonate composition of claim 1, wherein the poly (ester) different from poly (ethylene terephthalate) comprises a poly(alkylene terephthalate) different from poly (ethylene terephthalate), a poly(alkylene naphthoate), poly (alkylene cyclohexanedicarboxylate), a copolymer thereof, or a combination thereof.

9. The polycarbonate composition of claim 1, wherein the poly (ester) different from poly (ethylene terephthalate) comprises:

poly(1,4-butylene terephthalate), poly(n-propylene terephthalate), poly(ethylene naphthanoate), and poly (butylene naphthanoate), poly(cyclohexanedimethylene terephthalate)-co-poly(ethylene terephthalate), poly(1,4-cyclohexane-dimethanol-1,4-cyclohexanedicarboxylate), or a combination thereof.

10. The polycarbonate composition of claim 1, wherein the homopolycarbonate comprises a bisphenol A homopolycarbonate having a weight average molecular weight of 15,000-20,000 grams per mole, a bisphenol A homopolycarbonate having a weight average molecular weight of 20,000-25,000 grams per mole, or a combination thereof, each as measured via gel permeation chromatography using polystyrene standards and calculated for polycarbonate.

11. The polycarbonate composition of claim 1, wherein the poly (aliphatic ester-carbonate) comprises a poly(aliphatic ester-carbonate) having a weight average molecular weight from 18,000-30,000 grams/mole; or a poly(aliphatic ester-carbonate) having a weight average molecular weight from 30,000-45,000 grams/mole;

or a combination thereof, each as measured via gel permeation chromatography using polystyrene standards and calculated for polycarbonate.

12. The polycarbonate composition of claim 1 comprising 35-60 wt % of a poly(carbonate-co-monoarylate ester) comprising bisphenol A carbonate units, ester units derived from isophthalic acid, terephthalic acid, or a combination thereof and resorcinol, and resorcinol carbonate units;

5-30 wt % of poly(1,4-butylene terephthalate); and 25-50 wt % of a poly(aliphatic ester)-polycarbonate copolymer comprising bisphenol A sebacate ester units and bisphenol A carbonate units; or 25-50 wt % of a bisphenol A homopolycarbonate.

13. The polycarbonate composition of claim 1 comprising 35-60 wt % of a poly(carbonate-co-monoarylate ester) comprising bisphenol A carbonate units and ester units derived from isophthalic acid, terephthalic acid, or a combination thereof and resorcinol, and resorcinol carbonate units;

5-30 wt % of poly(1,4-butylene terephthalate);

10-25 wt % of poly(aliphatic ester)-polycarbonate copolymer comprising bisphenol A sebacate ester units and bisphenol A carbonate units; and 10-25 wt % of a bisphenol A homopolycarbonate.

14. An article comprising the polycarbonate composition of claim 1.

15. A method for forming the article according to claim 14, comprising molding, casting, or extruding the composition to provide the article.

16. The polycarbonate composition of claim 6 comprising 60-90 mol % of bisphenol A carbonate units, 10-30 mol % of isophthalic acid-terephthalic acid-resorcinol ester units, and 1-20 mol % of resorcinol carbonate units.

17. The polycarbonate composition of claim 8, wherein the poly(ester) different from poly(ethylene terephthalate) comprises poly(1,4-butylene terephthalate), poly(1,4-cyclohexane-dimethanol-1,4-cyclohexanedicarboxylate), poly (cyclohexanedimethylene terephthalate)-co-poly (ethylene terephthalate), or a combination thereof.

18. The article of claim 14, wherein the article is an interior or exterior automotive component.

19. The article of claim 14, wherein the article is a fender, a hood, a fascia, a front glass, a grill, a wiper, a steering wheel, a steering column, a seating system, an instrument panel, a roof, trim, a door panel, a pillar a floor rocker, a cross-bar, a glazing panel, a knee bolster, a headlamp assembly, a rear lamp assembly, a fog lamp, or an indicator light, computer and business machine housings.

20. The article of claim 19, wherein the housing is a housing for monitors, handheld electronic device housing, a housing for cell phones, electrical connectors, electrical switches, consumer electronics, a connected device for wireless, or a medical device.

* * * * *